United States Patent [19]

Honda et al.

[11] Patent Number: 5,662,984
[45] Date of Patent: Sep. 2, 1997

[54] MAGNETIC RECORDING MEDIUM

[75] Inventors: Hidetoshi Honda; Yasumi Sato; Taketoshi Sato; Jota Ito; Yoshihito Ebine; Toshikazu Sasaki, all of Miyagi, Japan

[73] Assignee: Sony Corporation, Tokyo, Japan

[21] Appl. No.: 250,432

[22] Filed: May 27, 1994

[30]   Foreign Application Priority Data

May 28, 1993   [JP]   Japan .................................. 5-127518

[51] Int. Cl.⁶ ........................... G11B 5/66; B32B 3/10; B32B 9/00; B32B 5/16
[52] U.S. Cl. .................... 428/141; 428/336; 428/408; 428/694 T; 428/694 TP; 428/694 TC; 428/694 TR; 428/900
[58] Field of Search ...................... 428/694 T, 694 TP, 428/694 TC, 694 TR, 141, 408, 336, 900

[56]   References Cited

U.S. PATENT DOCUMENTS

| | | | |
|---|---|---|---|
| 4,505,966 | 3/1985 | Adachi | 428/141 |
| 4,540,618 | 9/1985 | Suzuki | 428/141 |
| 4,639,389 | 1/1987 | Nishimatsu | 428/141 |
| 4,645,703 | 2/1987 | Suzuki | 428/141 |
| 4,762,742 | 8/1988 | Sonoda | 428/141 |
| 4,778,707 | 10/1988 | Arioka | 428/141 |
| 4,835,032 | 5/1989 | Arioka | 428/143 |
| 4,837,116 | 6/1989 | Arioka | 428/141 |
| 5,047,278 | 9/1991 | Ono | 428/141 |
| 5,082,714 | 1/1992 | Yanai | 428/141 |

OTHER PUBLICATIONS

Japanese Patent Abstract JP-A-01-176-313.
Japanese Patent Abstract JP-A-01-176-314.
Japanese Patent Abstract JP-A-01-176-311.

Primary Examiner—Leszek Kiliman
Attorney, Agent, or Firm—Hill, Steadman & Simpson

[57]   ABSTRACT

A magnetic recording medium has a magnetic layer formed by a thin magnetic metal layer and a carbon protective layer on a non-magnetic substrate; the surface of the carbon protective layer has first protrusions formed by first particles and second protrusions formed by second particles; the carbon protective film has a thickness in the range of 3 nm to 30 nm, while the first protrusions have the heights of 65 nm±15 nm to 95 nm±15 nm and the second protrusions have the heights of 18 nm±5 nm to 28 nm±5 nm; since the surface properties of the carbon protective film are controlled, the electro-magnetic conversion characteristics may be prevented from being lowered due to the spacing losses for improving the running durability of the recording medium.

7 Claims, 12 Drawing Sheets

MAGNETIC RECORDING MEDIUM

BACKGROUND OF THE INVENTION

This invention relates to a thin magnetic metal film type magnetic recording medium comprising a thin magnetic metal layer as a magnetic layer on a non-magnetic substrate.

In the field of video tape recorders, for example, there is a stronger demand for high density recording with a view to achieving high picture quality. As a magnetic recording medium for accommodating such demand, a so-called thin magnetic film type magnetic recording medium has been proposed, in which a magnetic layer is formed on the non-magnetic substrate by directly depositing a magnetic material of metal or a Co—Ni alloy on the substrate by plating or vacuum thin film forming techniques, such as vacuum deposition, sputtering or ion plating.

The magnetic recording medium of the thin magnetic film type has many advantages, including superior coercivity, rectangular ratio and electro-magnetic conversion characteristics in the short wavelength range, only little demagnetization during recording, only little thickness loss during reproduction because of the reduced thickness of the recording layer and high packing density of the magnetic material because it is unnecessary to mix the non-magnetic binder material into the magnetic layer.

In such magnetic recording medium, attempts have been made to increase the track density and the recording density of the magnetic recording medium in order to accommodate the increased recording density. However, if the recording density becomes higher, spacing losses are increased. Consequently, a smooth surface of the magnetic recording medium tends to be preferred in order to prevent the adverse effects of the increased spacing losses.

However, if the surface of the magnetic recording medium is smoothed excessively, the magnetic head tends to be adsorbed onto the recording medium, so that the force of friction therebetween is increased, with the result that the recording medium is injured by a larger shearing force generated therein.

In order to assure satisfactory still characteristics, it has been practiced to provide surface protrusions on the non-magnetic substrate and thereby to afford moderate roughness to the surface of the magnetic layer or the protective layer stacked on the non-magnetic recording medium so as to control surface properties of the magnetic recording medium.

For controlling the surface properties of the magnetic recording medium as described above, the size control of the surface protrusions formed on the non-magnetic recording medium becomes crucial. That is, the larger the size of the surface protrusions, the more pronounced becomes the problem of the spacing loss, with the result that the electro-magnetic conversion characteristics are deteriorated. Conversely, should the surface protrusions be restricted in height, a sufficient running durability cannot be maintained, although the adverse effects of the spacing losses may be eliminated.

Thus it is believed to be extremely difficult to control the size as well as the density of the surface protrusions and to achieve high electro-magnetic conversion characteristics and good running performance with high compatibility.

SUMMARY OF THE INVENTION

It is therefore an object of the present invention to provide a magnetic recording medium in which it is possible to improve the durability while maintaining good electro-magnetic conversion characteristics.

As a result of our diligent search toward accomplishing the above object, the present inventors have found that good running durability and high electro-magnetic conversion characteristics may be achieved simultaneously by forming a carbon protective film on the thin magnetic metal film and by forming two different kinds of the surface protrusions of different sizes at respective pre-set densities on the surface of the carbon protective film.

Thus the present invention provides a magnetic recording medium comprising a non-magnetic substrate, a thin magnetic metal layer formed on said non-magnetic substrate as a magnetic film, and a carbon protective film, formed on the thin magnetic metal film, wherein the carbon protective film has a thickness in the range of 3 nm to 30 nm, the carbon protective film presenting first protrusions and second protrusions, the first protrusions having a height in the range of 65 nm±15 nm to 95 nm±15 nm, and the second protrusions having a height in the range of from 18 nm±5 nm to 28±5 nm.

In one aspect of the present invention, the carbon protective film has a thickness in the range of 3 nm to 7 nm, the first protrusions having a height in the range of 65 nm±15 nm are formed on the surface of the carbon protective film at a density of $1.5 \times 10^4/mm^2$ to $6.0 \times 10^4/mm^2$ and the second protrusions having a height in the range of 18 nm±5 nm are formed on the surface of the carbon protective film at a density of $500 \times 10^4$ to $4500 \times 10^4/mm^2$.

In another aspect of the present invention, the carbon protective film has a thickness in the range of 3 nm to 7 nm, the first protrusions having a height in the range of 65 nm±15 nm are formed on the surface of the carbon protective film at a density of $10 \times 10^4/mm^2$ to $5.0 \times 10^4/mm^2$ and the second protrusions having a height in the range of 28 nm±5 nm are formed on the surface of the carbon protective film at a density of $400 \times 10^4$ to $4000 \times 10^4/mm^2$.

In a further aspect of the present invention, the carbon protective film has a thickness in the range of 3 nm to 7 nm, the first protrusions having a height in the range of 95 nm±15 nm are formed on the surface of the carbon protective film at a density of $1.0 \times 10^4/mm^2$ to $4.0 \times 10^4/mm^2$ and the second protrusions having a height in the range of 28 nm±5 nm are formed on the surface of the carbon protective film at a density of $400 \times 10^4/mm^2$ to $3500 \times 10^4/mm^2$.

In a further aspect of the present invention, the carbon protective film has a thickness in the range of 7 nm to 15 nm, the first protrusions having a height in the range of 65 nm±15 nm are formed on the surface of the carbon protective film at a density of $1.0 \times 10^4/mm^2$ to $4.0 \times 10^4/mm^2$ and the second protrusions having a height in the range of 18 nm±5 nm are formed on the surface of the carbon protective film at a density of $400 \times 10^4$ to $2500 \times 10^4/mm^2$.

In a further aspect of the present invention, the carbon protective film has a thickness in the range of 7 nm to 15 nm, the first protrusions having a height in the range of 95 nm±15 nm are formed on the surface of the carbon protective film at a density of $0.7 \times 10^4/mm^2$ to $2.8 \times 10^4/mm^2$ and the second protrusions having a height in the range of 28 nm±5 nm are formed on the surface of the carbon protective film at a density of $400 \times 10^4$ to $2000 \times 10^4/mm^2$.

In yet another aspect of the present invention, the carbon protective film has a thickness in the range of 15 nm to 30 nm, the first protrusions having a height in the range of 65 nm±15 nm are formed on the surface of the carbon protective film at a density of $1.0 \times 10^4/mm^2$ to $3.0 \times 10^4/mm^2$ and the second protrusions having a height in the range of 18 nm±5 nm are formed on the surface of the carbon protective film at a density of $400\times10^4$ to $2000\times10^4/mm^2$.

If, with the magnetic recording medium having the magnetic layer formed of the thin magnetic metal film and the carbon protective film on the non-magnetic substrate, the two different kinds of surface protrusions with different heights are formed on the surface of the carbon protective film with respective preset densities, the surface properties of the magnetic recording medium may be controlled satisfactorily with the result that the state of contact of the recording medium with the magnetic head during the sliding of the recording medium and hence the running performance of the recording medium may be improved. On the other hand, the electro-magnetic conversion characteristics may be prevented from being deteriorated due to spacing losses.

DETAILED DESCRIPTION

Figure 1:
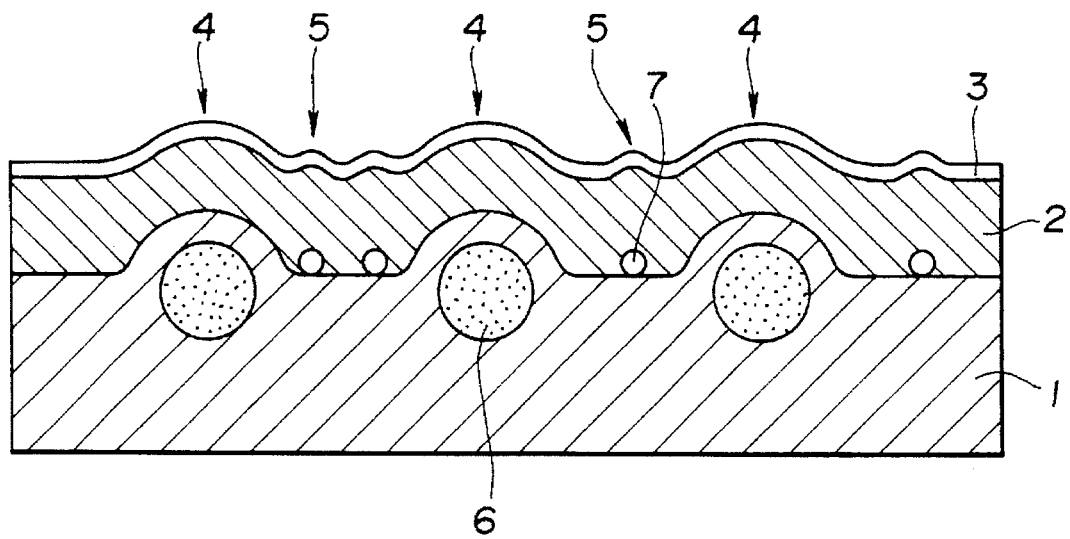
FIG. 1 is a cross-sectional view showing a structural example of a magnetic recording medium according to the present invention.

The present invention is applied to a so-called thin magnetic film type magnetic recording medium in which a thin magnetic metal film is formed as a magnetic layer on a non-magnetic substrate, which may be a plastic film or the like. There is no limitation to the constituent material of the thin magnetic metal material and any of the well-known ferromagnetic materials, such as Co, Co—Cr, Co—Ni, Co—Fe—Ni or Co—Ni—Cr, may be employed. As the method for forming the thin magnetic metal film, the vacuum thin film forming technique may be recited, and any of the vacuum deposition method, sputtering method and the ion plating method, may be employed.

With the above-described thin film type magnetic recording medium, the surface properties may be controlled by forming surface protrusions on the surface of the magnetic recording medium for improving its running characteristics. However, if the surface protrusions are formed, the spacing loss is correspondingly reduced, with the result that the electro-magnetic conversion characteristics are deteriorated.

According to the present invention, the carbon protective film is formed on the thin magnetic metal film, and two different kinds of surface protrusions are formed on the surface of the carbon protective film for controlling the surface properties of the magnetic recording medium. In this manner, the magnetic recording medium may be improved in running durability without substantially deteriorating its electro-magnetic conversion characteristics.

If the thickness of the carbon protective film is less than 3 nm, there is only minor effect in improving the durability, whereas, if it exceeds 30 nm, the spacing loss is increased and the electro-magnetic conversion characteristics are deteriorated. Specifically, with the thickness d of the carbon protective film, the spacing loss equal to $-74\times d/1$ (dB) is produced, such that, with the thickness of the carbon protective film of 30 nm, the spacing loss amounts to approximately 4.5 dB. Consequently, is not desirable to increase the thickness of the carbon protective film further.

If the combination of the thickness of the carbon protective film, the height and the density of the first surface protrusions and the height and the density of the second surface protrusions, is outside the above range, the running durability or the electro-magnetic conversion characteristics is deteriorated. For this reason, the above limitations are imposed on the height and the density of the first surface protrusions and the height and the density of the second surface protrusions.

The magnetic recording medium having the first and second surface protrusions is fabricated using the particles having the particle sizes corresponding to the heights of the respective surface protrusions.

For example, if the non-magnetic substrate is fabricated by dispersing the first particles having the particle size of 65±15 nm in the starting material for the non-magnetic substrate (chip), surface protrusions are produced, which have a height corresponding to the particle diameter, if the protruding extent of the first particle is summed to the thickness of the resin coating formed thereon. The amount of addition of the first particles to the starting material is adjusted so that the density of the surface protrusions protruded on the surface of the non-magnetic substrate is comprised within the above range.

The second particles having the particle size of 18 nm±5 nm are arranged on the non-magnetic substrate and fixed using a resin binder. In this manner, the non-magnetic substrate having two different kinds of surface protrusions of 65 nm±16 nm and 18 nm±5 nm is produced.

If the thin magnetic metal film is formed on the non-magnetic substrate, the shape of the protrusions on the non-magnetic substrate is reflected on the surface of the thin magnetic metal substrate. Similarly, if the carbon protective film is formed thereon, the shape of the protrusions on the thin magnetic metal film is reflected on the surface of the carbon protective film. Thus the magnetic recording medium having the first surface protrusions having the height of 65 nm±15 nm and the second surface protrusions having the height of 18 nm±5 nm on the surface of the carbon protective film is produced.

The accuracy with which the shape of the protrusions in the non-magnetic substrate is reflected on the surface of the carbon protective film depends on the thickness of the thin magnetic metal film and that of the carbon protective film. Since the shape of the protrusions in the non-magnetic substrate is reflected on the surface with higher accuracy if the two films are of reduced thicknesses, the thicknesses of the thin magnetic metal film and the carbon protective film are desirably set in view of the properties thereof in reflecting the shape of the protrusions.

Although the surface protrusions are previously formed on the non-magnetic substrate in the above-described method, the non-magnetic substrate having a planar surface may be employed, and the first and second particles may be arranged with the respective densities on the surface of the thin magnetic metal film, with the protrusions being retained in position by a carbon protective film applied thereon.

The particles forming the surface protrusions may be those of $SiO_2$, $TiO_2$, $Al_2O_3$ or $CaCO_3$ or aqueous or non-aqueous emulsions thereof. Alternatively, latexes may also be employed. There is no particular limitation to the types of the synthetic resins, such that thermoplastic resins, inclusive of homopolymers or copolymers of vinyl acetate, acrylates, methacrylates, vinylidene chloride, vinyl chloride, ethylene or styrene, thermosetting resins, such as epoxy resins, or synthetic rubber, such as butadiene-styrene copolymers or butadiene-acrylonitrile copolymers.

As the carbon protective film, any of those used in the thin magnetic metal magnetic recording medium may be employed. $CrO_2$, $Al_2O_3$, oxides of BN and Co, MgO, $SiO_2$, $Si_3O_4$, $SiN_x$, SiC, $SiNx$—$SiO_2$, $ZrO_2$, $TiO_2$ or TiC may be employed besides carbon. The film may be formed as a sole film, a multi-layered film or a composite film by vacuum thin film forming techniques.

An underlying layer, a back coat layer or a top layer may optionally be formed on the non-magnetic substrate, if so desired. There is no limitation to the method of forming the films of the underlying layer, back coat layer or the top layer if such method is commonly used with this type of the magnetic recording medium. A lubricant film is desirably formed on the carbon protective film.

EMBODIMENTS

Referring to the drawings, preferred embodiments of the present invention will be explained in detail.

In the present embodiment, for forming two kinds of protrusions on the surface of a carbon protective film, surface protrusions by two different kinds of particles having different particle sizes were formed on a non-magnetic substrate and subsequently a thin magnetic metal film and the carbon protective film were formed.

The magnetic recording medium of the present embodiment (magnetic tape) has a thin-film magnetic layer 2, having a thickness of 0.5 μm or less, formed on a non-magnetic substrate 1, and a carbon protective film 3 formed on the magnetic layer 2, as shown in FIG. 1.

On the non-magnetic substrate 1 are formed first surface protrusions 4 of a larger size and second surface protrusions 5 of a smaller size.

When producing the above-described magnetic tape, the first surface protrusions 4 were formed by internally adding $SiO_2$ particles as first particles of a larger particle size 6 in the non-magnetic substrate 1 for reflecting the particle shape of the first particles 6 on the surface of the non-magnetic substrate 1. The first particles 6 are suitably dispersed within the inside of the non-magnetic substrate 1. However, the first particles 6 are locally agglomerated together.

The second surface protrusions 5 were formed by dispersing $SiO_2$ particles as the second particles of a smaller particle size 7 on the non-magnetic substrate 1 and fixing them using a binder resin or the like. These first particles were suitably dispersed on the first non-magnetic substrate 1 so as to provide the desired density of the protrusions.

On the non-magnetic substrate 1, on which the two kinds of the surface protrusions have been formed as described above, the thin magnetic metal film was formed, such as by vacuum deposition, for forming the magnetic layer 2. On the magnetic layer 2, the carbon protective film 3 of diamond-like carbon was formed to a film thickness of 3 nm to 30 nm, such as by sputtering, and a lubricant was applied on the surface of the carbon protective film 3 to produce the magnetic tape.

Specifically, magnetic tape samples were prepared in which, for the carbon protective film 3 having the thickness of 3 to 7 nm, 7 to 15 nm and 15 to 30 nm, the first particles 6 having the particle size of 35 nm±15 nm, 65 nm±15 nm and 95 nm±15 nm and the second particles 7 having the particle size of 18 nm±5 nm and 28 nm±5 nm were used, and the two particles were changed in density values.

For checking into an optimum combination of the thickness of the carbon protective film 3 and the particle size and density of the first particles 6 and the second particles 7, magnetic properties of the various magnetic tape samples were checked.

Experiment 1

In the present experiment, the thickness of the carbon protective film 3 was set to 3 to 7 nm, while the particle size of the second particles 7 was set to 18 nm±5 nm, and the optimum combination of the particle size and the particle density of the first particles was checked.

Figure 2:
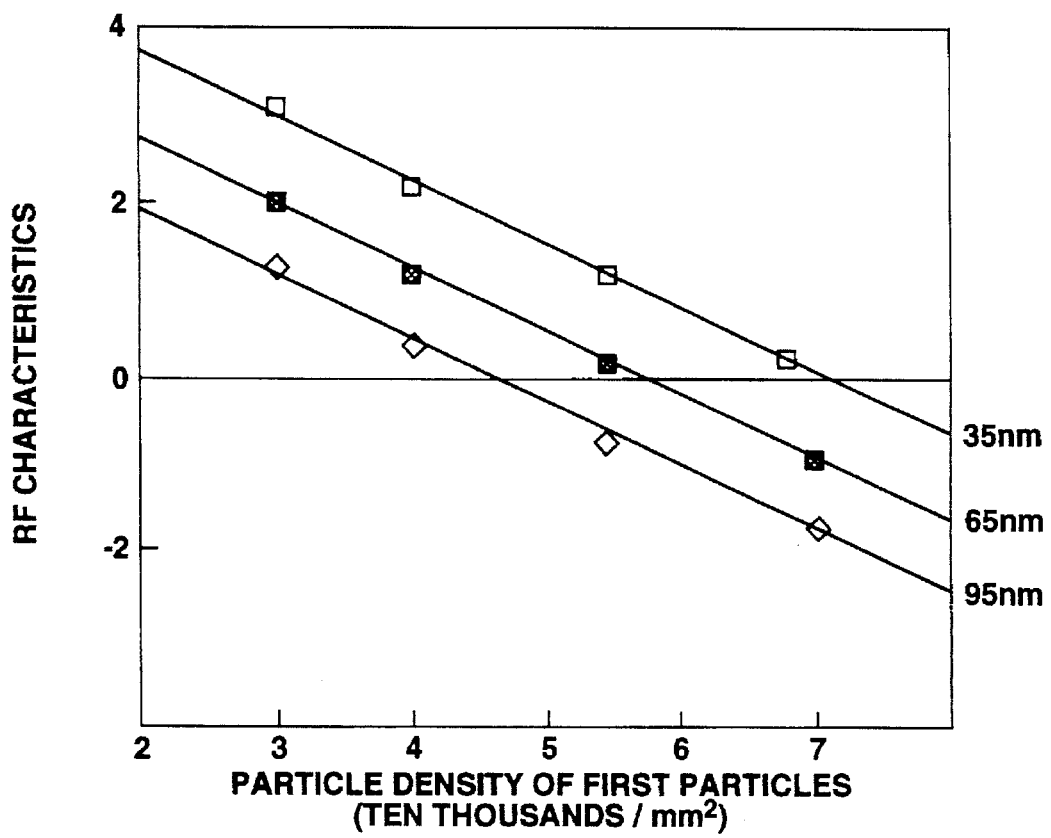
FIG. 2 is a graph showing the relation between the density of a first particle internally added in the non-magnetic substrate and RF characteristics, as affirmed by an experiment 1.

First magnetic tape samples were prepared in which the first particles 6 having three different particle sizes of 35 nm±15 nm, 65 nm±15 nm and 95 nm±15 nm were changed in particle density, and measurements were made of the relation between the particle density and the RF characteristics. The results are shown in FIG. 2. The thickness of the carbon protective film 3 was set to 7 nm, which is the thickness which leads to the severest deterioration of the output within the range of the condition of the present experiment.

It is seen from FIG. 2 that, no matter which size particles are used as the first particles 6, the Rf characteristics are lowered with increase in the particle density of the first particles 6. Also the RF characteristics are lowered with increase in the particle size of the first particles 6 employed.

Figure 3:
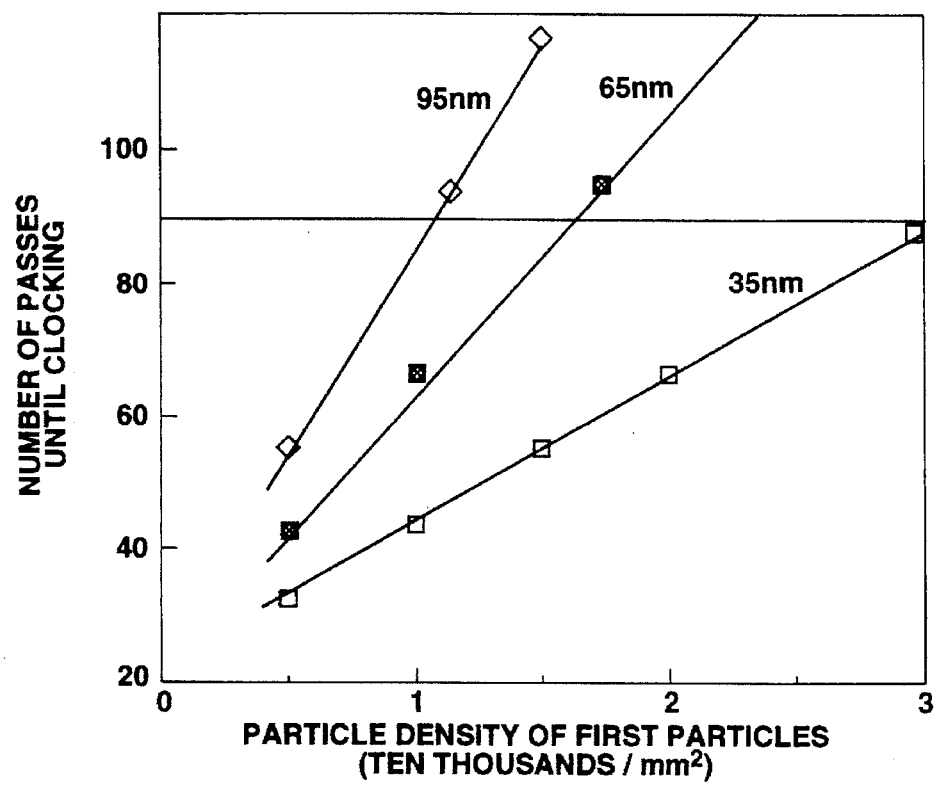
FIG. 3 is a graph showing the relation between the density of the first particle and the number of passes until clogging.
Figure 4:
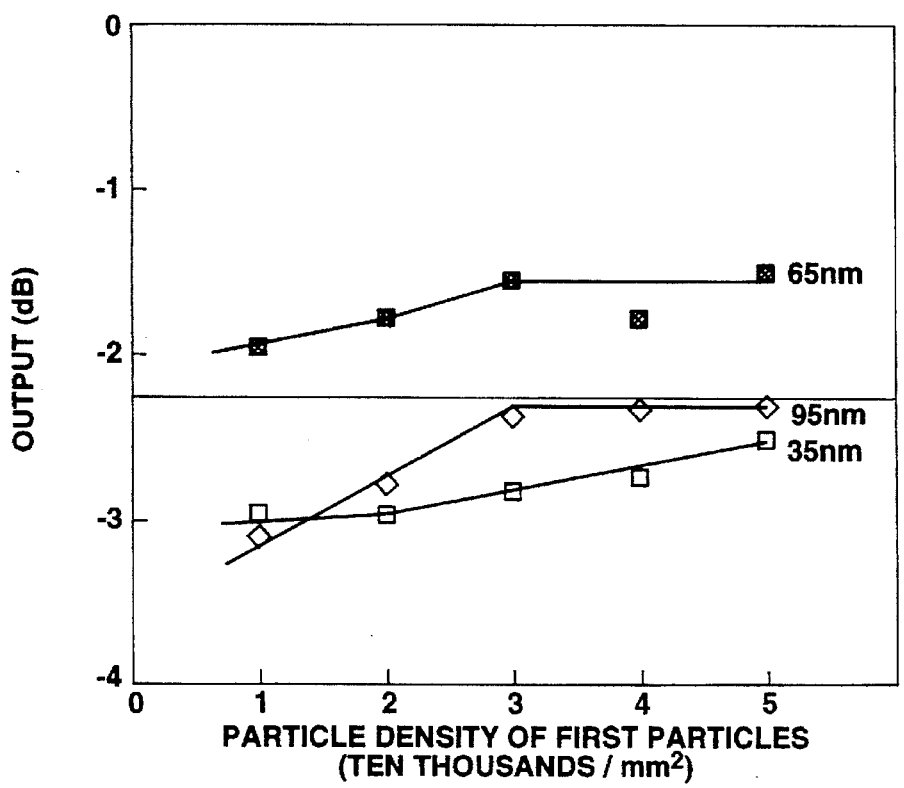
FIG. 4 is a graph showing the relation between the density of the first particle and the output level-down.

It is also seen that, if an output not lower than 0 dB is desired to be produced, the particle density needs to be set to $7.0 \times 10^4/mm^2$ or less, $6.0 \times 10^4/nm^2$ or less and $4.8 \times 10^4/mm^2$ or less, for the particle size of the first particles 6 of 35 nm±15 nm, 65 nm±15 nm and 95 nm±15 nm, respectively, On the other hand, the relation between the particle density of the first particles 6 and the number of passes up to clogging was checked for the magnetic tape samples with the above-described three different particle sizes. The results are shown in FIG. 3. The number of passes up to clogging is the number of passes until the first one of the five decks undergoes clogging and the thickness of the carbon protective film 3 was set to 3 nm, which is the thickness most liable to clogging within the range of the condition of the present experiment.

It is seen from FIG. 3 that, no matter which particle size is used as the first particle 6, the higher is the particle density, the larger becomes the value of the number of passes up to clogging. If the number of passes is set to 90, it is necessary for the particle density to be not less than $3.0 \times 10^4/mm^2$, not less than $1.5 \times 10^4/mm^2$ and not less than $1.2 \times 10^4/mm^2$, for the particle size of the first particle 6 of 35 nm±15 nm, 65 nm±15 nm and 95 nm±15 nm, respectively.

It has thus been found that, for achieving both the superior electro-magnetic conversion characteristics and durability, it is necessary for the particle density to be 3.0 to $7.0 \times 10^4/mm^2$, 1.5 to $6.0 \times 10^4/mm^2$ and 1.2 to $4.8 \times 10^4/mm^2$, for the particle size of the first particle 6 of 35 nm+15 nm, 65 nm+15 nm and 95 nm±15 nm, respectively.

If these results are analyzed in conjunction with the relation between the particle size of the first particle 6 and the output level-down from the ideal state after running for four hours, it may be seen that, for the particle having the particle size of 95 nm±15 nm and the particles having the particle size of 35 nm±15 nm, the power level-down is significant even within the above range of the particle density, such that, if the lower limit of the power level-down is set to −2.25 dB, the magnetic tape becomes unusable. Conversely, if the particle having the particle size of 65 nm±15 nm is used, sufficient characteristics may be achieved within the above range of the particle density. It is noted that the power level-down value is not dependent on the thickness of the carbon protective film 3.

It has been seen from above that, if the second particle 7 having the particle size of 18 nm±5 nm is used, it is preferred to use the first particle 6 having the particle size of 65 nm±15 nm with the particle density of 1.5 to $6.0 \times 10^4/mm^2$.

With the magnetic tape, the first particle 6 for which is as defined above, the relation of the particle density of the second particle 7 versus still characteristics was checked. The still characteristics were defined as the average time in minutes until clogging occurred in eight magnetic heads, while the thickness of the carbon protective film 3 was set to 3 nm which is the value corresponding to the worst value of still characteristics within the range of the condition of the present experiment.

Figure 5:
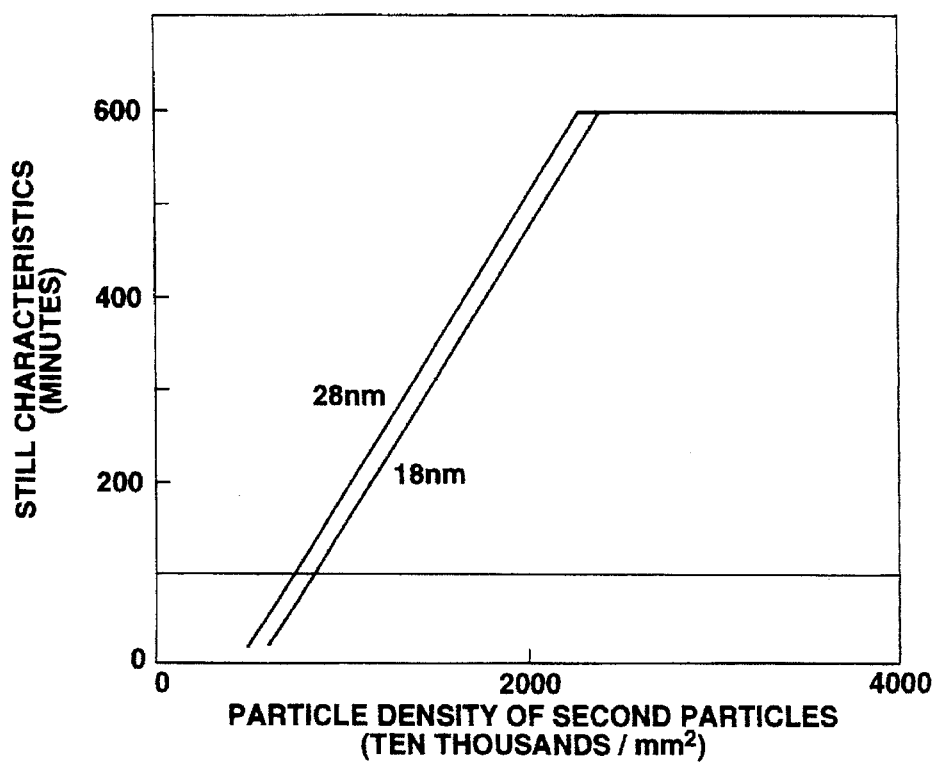
FIG. 5 is a graph showing the relation between the density of a second particle dispersed on the nonmagnetic substrate and still characteristics.

FIG. 5 shows the relation of the particle density of the second particle 7 versus the still characteristics. Meanwhile, the results are shown in FIG. 5 along with the results obtained with the samples used in the experiment 2 in which the particle size of the second particle 7 is set to 28 nm. The data for the present experiment in FIG. 5 is that with the indication of 18 nm.

It is seen from FIG. 5 that, for obtaining practically acceptable still characteristics of not less than 100 minutes, it is necessary for the density of the second particle 7 to be not less than $500 \times 10^4/mm^2$.

Figure 6:
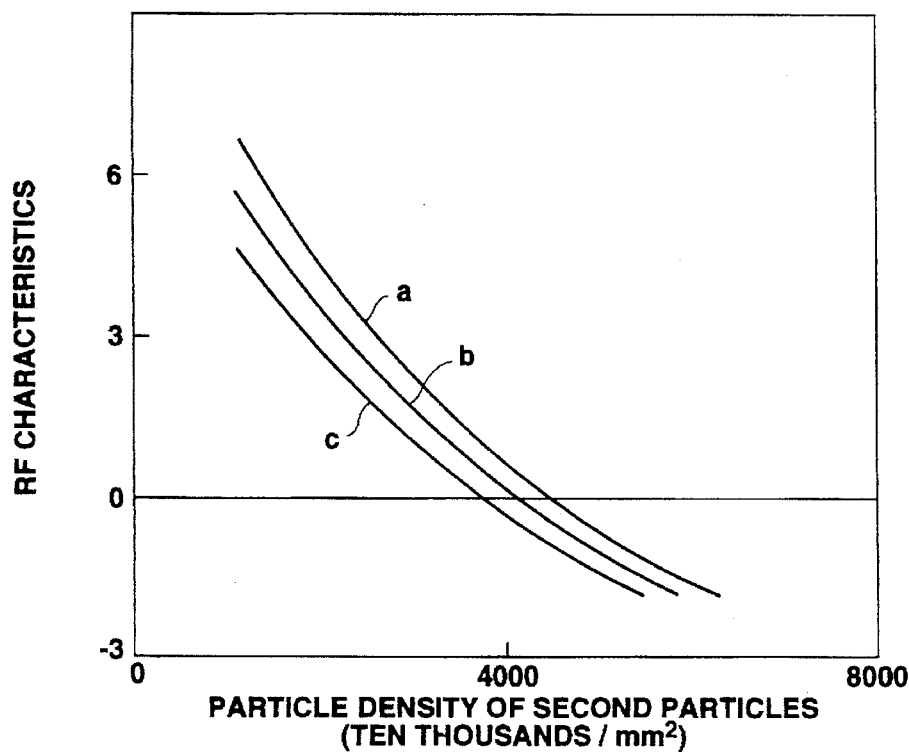
FIG. 6 is a graph showing the relation between the density of the second particle and RF characteristics.

The relation between the particle density of the second particle 7 and RF characteristics is shown by a curve a in FIG. 6. The thickness of the carbon protective film 3 was set to 7 nm which is the value corresponding to the worst value of still characteristics within the range of the condition of the present experiment. Meanwhile, curves b and c denote data for the experiment 2.

It is seen from FIG. 6 that, if the output of the RF characteristics should be 0 dB or higher, the density of the second particle 7 should be $4500 \times 10^4/mm^2$.

Consequently, if the superior electro-magnetic conversion characteristics and the superior durability should be achieved simultaneously, it is necessary to set the density of the second particle 7 so as to be 500 to $4500 \times 10^4/mm^2$.

From the above results, it may be seen that, by fixing the first particles 6 having the particle size of 65±15 nm and the second particles 7 having the particle size of 18±5 nm at the densities of $1.5 \times 10^4/mm^2$ to $6.0 \times 10^4/mm^2$ and $500 \times 10^4/mm^2$ to $4500 \times 10^4/mm^2$ respectively for producing protrusions on the non-magnetic substrate, and further forming the carbon protective film on the magnetic layer to a thickness of 3 nm to 7 nm, a magnetic tape having the electro-magnetic conversion characteristics in good equilibrium with the running characteristics may be produced.

Experiment 2

With magnetic tape samples in which the thickness of the carbon protective film 3 was set to 3 to 7 nm as in Experiment 1 and the particle size of the second particle 7 was set to 28 nm±5 nm, the desirable particle size and the desirable particle density of the first particle were checked.

Figure 7:
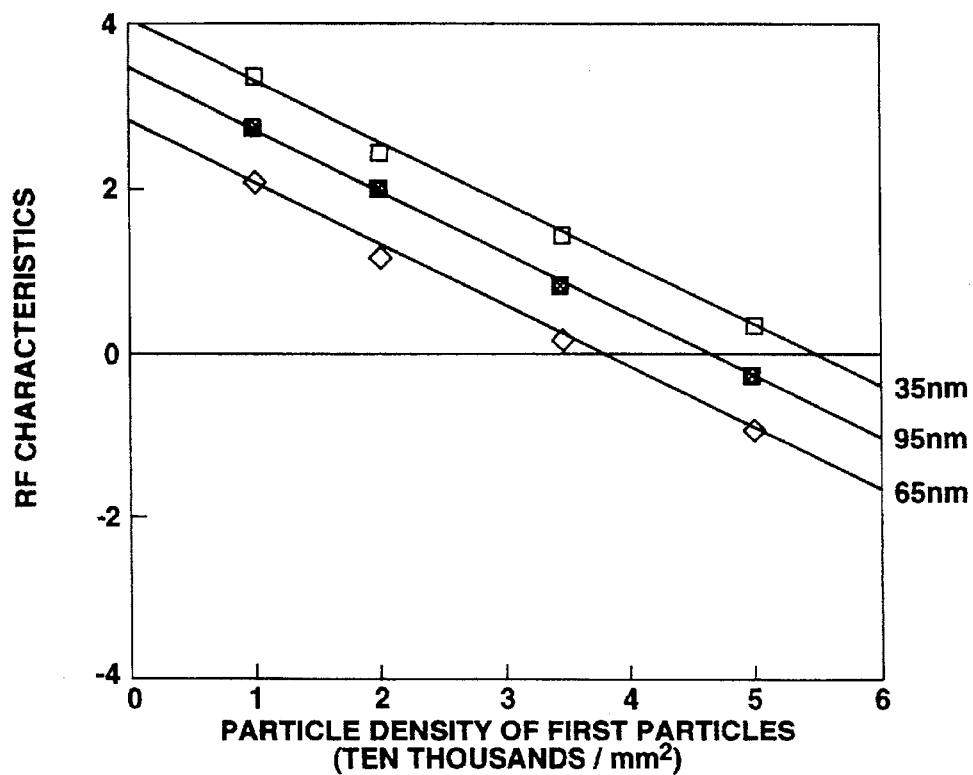
FIG. 7 is a graph showing the relation between the density of a first particle internally added in the non-magnetic substrate and RF characteristics, as affirmed by an experiment 2.

Thus the relation between the particle density and RF characteristics was checked for magnetic tape samples in which the first particles 6 having three particle size ranges of 35 nm±15 nm, 65 nm±15 nm and 95 nm±15 nm were changed in the particle density. The results are shown in FIG. 7. The thickness of the carbon protective film 3 was set to 7 nm which is the value corresponding to the worst value of still characteristics within the range of the condition of the present experiment.

It is seen from FIG. 7 that, no matter which size of the particles is used for the first particle 6, the higher the particle density of the first particle 6, the lower become the RF characteristics, and the larger the particle size of the first particle 6, the lower become the RF characteristics.

It is also seen that, if an output not lower than 0 dB is desired, the particle density needs to be set to $6.0 \times 10^4/mm^2$ or less, $5.0 \times 10^4/mm^2$ or less and $4.0 \times 10^4/mm^2$ or less, for the particle size of the first particles 6 of 35 nm±15 nm, 65 nm±15 nm and 95 nm±15 nm, respectively.

Figure 8:
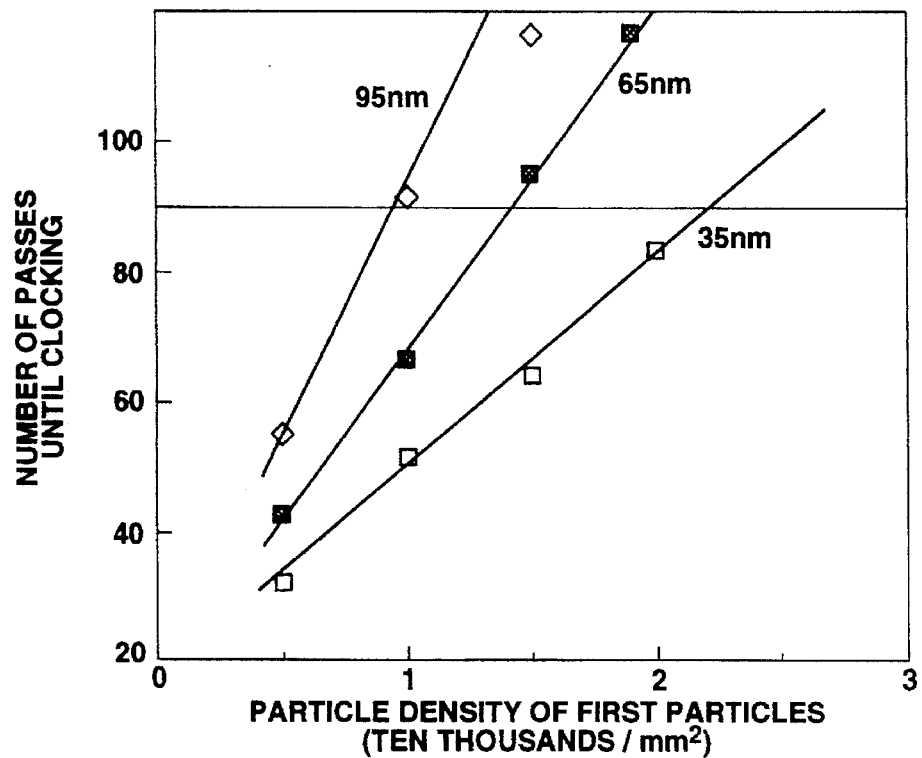
FIG. 8 is a graph showing the relation between the density of the first particle and the number of passes until clogging in the experiment 2.

On the other hand, the relation between the particle density of the first particles 6 and the number of passes up to clogging was checked for the magnetic tape samples with the above-described three different particle sizes of the first particles 6. The results are shown in FIG. 8. The number of passes up to clogging is the number of passes until the first one of the five decks underwent the clogging, and the thickness of the carbon protective film 3 was set to 3 nm, which is the thickness most liable to clogging within the range of the condition of the present experiment.

It is seen from FIG. 8 that, no matter which particle size is used as the first particle 6, the higher is the particle density, the larger becomes the value of the number of passes up to clogging. If the number of passes is set to 90, it is necessary for the particle density to be not less than $2.0 \times 10^4/mm^2$, not less than $1.1 \times 10^4/mm^2$ and not less than $10 \times 10^4/mm^2$, for the particle size of the first particle 6 of 35 nm+15 nm, 65 nm±15 nm and 95 nm±15 nm, respectively.

It has thus been found that, for achieving both the superior electro-magnetic conversion characteristics and durability, it is necessary for the particle density to be 2.0 to $6.0 \times 10^4/mm^2$, 1.1 to $5.0 \times 10^4/mm^2$ and 1.0 to $4.0 \times 10^4/mm^2$, for the particle size of the first particle 6 of 35 nm±15 nm, 65 nm±15 nm and 95 nm±15 nm, respectively.

Figure 9:
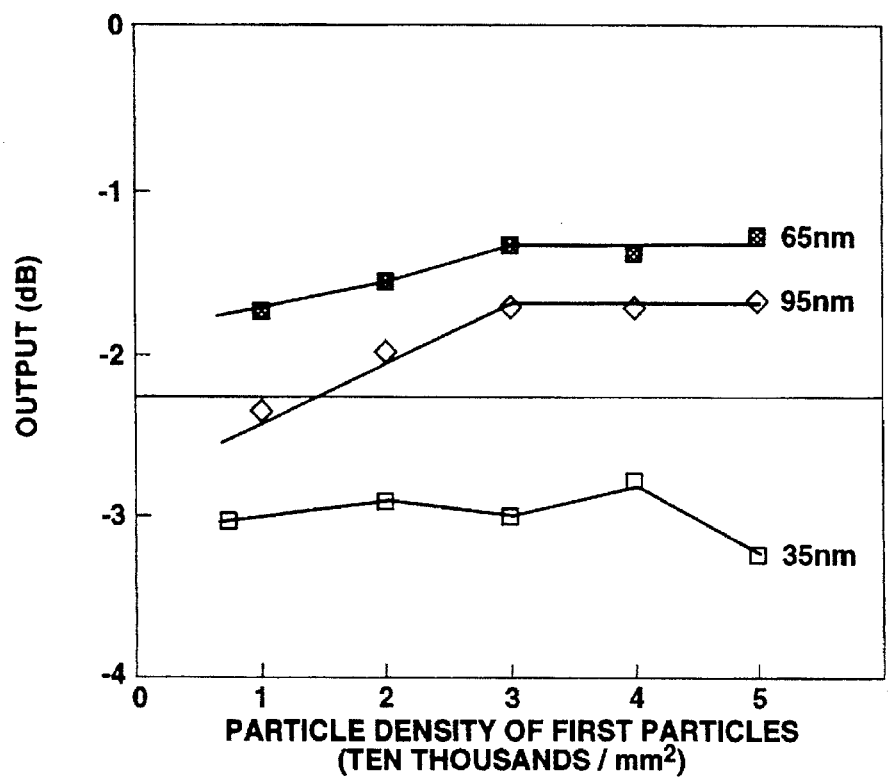
FIG. 9 is a graph showing the relation between the density of the first particle and the output level-down in the experiment 2.

These results were checked in conjunction with the relation between the particle density of the first particle 6 and the output level-down from the ideal state as reached after tape running for four hours as shown in FIG. 9.

It may thus be seen that, if the first particles 6 having the particle size of 35 nm±15 nm are used, the output level-down becomes significant even within the above range of the particle size and, if the lower limit of the output level-down is set to −2.25 dB, the resulting tape becomes unusable. Conversely, if the first particles 6 having the particle size range of 65 nm±15 nm or 95 nm±15 nm are used, a sufficient output level may be achieved within the above-mentioned particle density range. Meanwhile, the output level-down is not dependent upon the thickness of the carbon protective film 3.

It is seen from above that, if the second particles 7 having the particle size of 28 nm±5 nm are used, it is desirable to use the first particles 6 having the particle size of 65 nm±15 nm or 95±15 nm with the particle density of 1.1 to $5.0 \times 10^4/mm^2$ or 1.0 to $4.0 \times 10^4/mm^2$, respectively.

With the magnetic tape, the first particle 6 for which is as defined above, the relation of the particle density of the second particle 7 versus still characteristics was checked. The still characteristics were defined as the average time in minutes until clogging occurred in eight magnetic heads, while the thickness of the carbon protective film 3 was set to 3 nm which is the value corresponding to the worst value of still characteristics within the range of the condition of the present experiment.

FIG. 5 shows the relation of the particle density of the second particle 7 versus the still characteristics. Meanwhile, the results are shown in FIG. 5 along with the results obtained with the samples used in the experiment 1 in which the particle size of the second particle 7 is set to 18 nm. The data for the present experiment in FIG. 5 is that with the indication of 28 nm.

It is seen from FIG. 5 that, for obtaining practically acceptable still characteristics of not less than 100 minutes, it is necessary for the density of the second particle 7 to be not less than $400 \times 10^4/mm^2$. It is also seen that the present sample is superior in still characteristics to the sample having the particle size of the second particle 7 set to 18 nm.

FIG. 6 also shows the relation between the density of the second particles 7 and RF characteristics.

The relation between the particle density of the second particle 7 and RF characteristics is shown in FIG. 6. The thickness of the carbon protective film 3 was set to 7 nm which is the value corresponding to the worst output value within the range of the condition of the present experiment. The above relation with the use of the first particles 6 having the particle size of 65 nm±15 nm is shown by a curve b, while that with the use of the second particles 7 having the particle size of 95 nm±15 nm is shown by a curve c in FIG. 6.

It is seen from FIG. 6 that, in order to have the output of the RF characteristics of not less than 0 dB, the density of the second particles 7 has to be set so as to be $4000 \times 10^4/mm^2$ and $3500 \times 10^4/mm^2$ for the particle size of the first particle 6 of 65 nm±15 nm and 95 nm±15 nm, respectively.

Consequently, if it is desired to achieve satisfactory electro-magnetic conversion characteristics and superior durability simultaneously, it is necessary for the density of the second particles 7 to be set to 400 to $4000 \times 10^4/mm^2$ and to 400 to $3500 \times 10^4/mm^2$ for the particle size of the first particles 6 of 65 nm±15 nm and 95 nm±15 nm, respectively.

In FIG. 6, the data obtained with the use of the second particles 7 having the particle size of 18 nm±5 nm in the above experiment 1 are also shown by the curve a. It may be seen that the data shown by the curve a are slightly superior in RF characteristics to the data obtained with the usee of the second particles 7 having the particle size of 28 nm±5 nm shown by the curves b and c.

From the above results, it may be seen that, by fixing the first particles 6 having the particle size of 65 nm±15 nm and the second particles 7 having the particle size of 28 nm±5 nm at the densities of $1.1 \times 10^4/mm^2$ to $5.0 \times 10^4/mm^2$ and $400 \times 10^4/mm^2$ to $4000 \times 10^4/mm^2$ respectively or by fixing the first particles 6 having the particle size of 95 nm±15 nm and the second particles 7 having the particle size of 28 nm±5 nm at the densities of $1.0 \times 10^4/mm^2$ to $4.0 \times 10^4/mm^2$ and $400 \times 10^4/mm^2$ to $3500 \times 10^4/mm^2$ respectively for producing protrusions in the non-magnetic substrate, and further forming the carbon protective film on the magnetic layer to a thickness of 3 nm to 7 nm, a magnetic tape having the electro-magnetic conversion characteristics in good equilibrium with the running characteristics may be produced.

Experiment 3

With magnetic tape samples in which the thickness of the carbon protective film 3 was set to 7 to 15 nm and the particle size of the second particle 7 was set to 18±5 nm, the desirable particle size and the desirable particle density of the first particle were checked.

Figure 10:
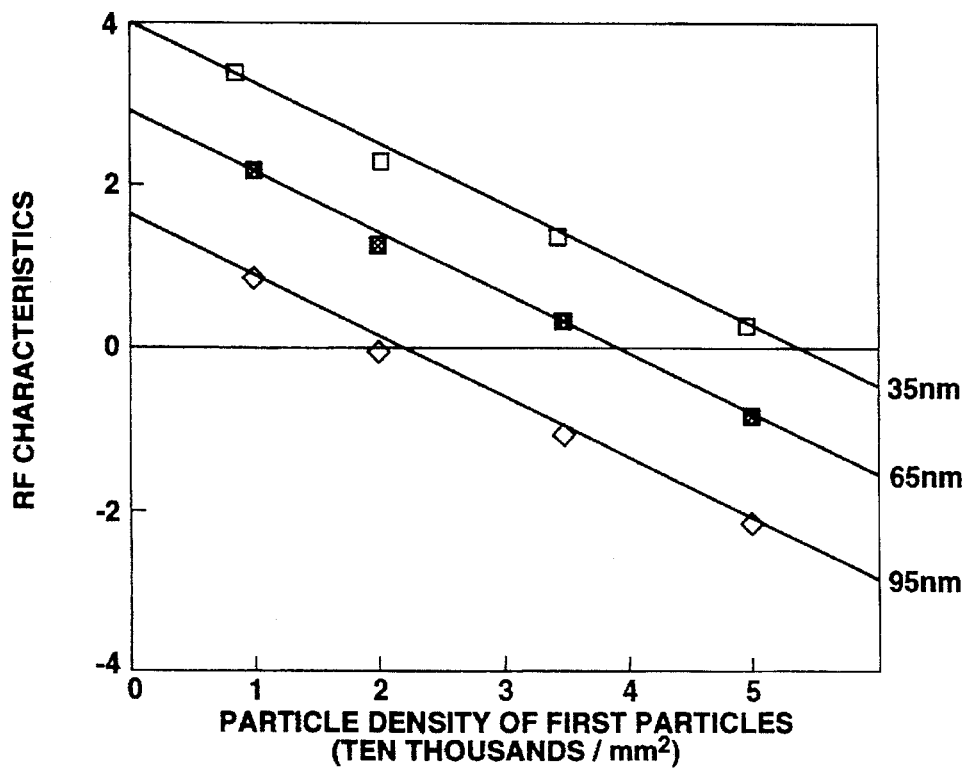
FIG. 10 is a graph showing the relation between the density of a first particle internally added in the non-magnetic substrate and RF characteristics, as affirmed by an experiment 3.

Thus the relation between the particle density and RF characteristics was checked for magnetic tape samples in which the first particles 6 having three particle size ranges of 35 nm±15 nm, 65 nm±15 nm and 95 nm±15 nm were changed in the particle density. The results are shown in FIG. 10. The thickness of the carbon protective film 3 was set to 15 nm which is the value corresponding to the worst output value within the range of the condition of the present experiment.

It is seen from FIG. 10 that, no matter which size of the particles is used for the first particle 6, the higher the particle density of the first particle 6, the lower become the RF characteristics, and the larger the particle size of the first particle 6, the lower become the RF characteristics.

It is also seen that, if an output not lower than 0 dB is desired, the particle density needs to be set to $5.0\times10^4$/mm$^2$ or less, $4.0\times10^4$/mm$^2$ or less and $2.8\times10^4$/mm$^2$ or less, for the particle size of the first particles 6 of 35±15 nm, 65±15 nm and 95±15 nm, respectively.

Figure 11:
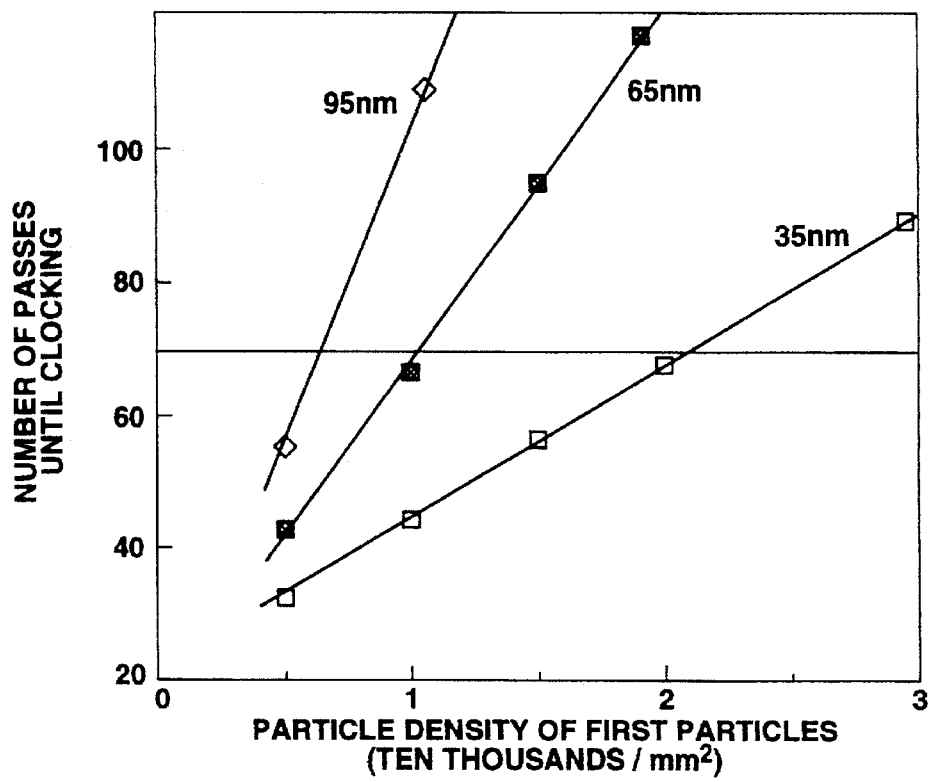
FIG. 11 is a graph showing the relation between the density of the first particle and the number of passes until clogging in the experiment 3.

On the other hand, the relation between the particle density of the first particles 6 and the number of passes up to clogging was checked for the magnetic tape samples with the above-described three different particle sizes of the first particles 6. The results are shown in FIG. 11. The number of passes up to clogging is the number of passes until the first one of the five decks underwent the clogging, and the thickness of the carbon protective film 3 was set to 7 nm, which is the thickness most liable to clogging within the range of the condition of the present experiment.

It is seen from FIG. 11 that, no matter which particle size is used as the first particle 6, the higher is the particle density, the larger becomes the value of the number of passes up to clogging. If the lower limit of the number of passes is set to 70, it is necessary for the particle density to be not less than $2.0\times10^4$/mm$^2$ not less than $10\times10^4$/mm$^2$ and not less than $0.7\times10^4$/mm$^2$ for the particle size of the first particle 6 of 35 nm±15 nm, 65 nm±15 nm and 95 nm±15 nm, respectively.

It has thus been found that, for achieving both the superior electro-magnetic conversion characteristics and durability, it is necessary for the particle density to be 2.0 to $5.0\times10^4$/mm$^2$, 1.0 to $4.0\times10^4$/mm$^2$ and 0.7 to $2.8\times10^4$/mm$^2$ for the particle size of the first particle 6 of 35 nm±15 nm, 65 nm±15 nm and 95 nm±15 nm, respectively.

Figure 12:
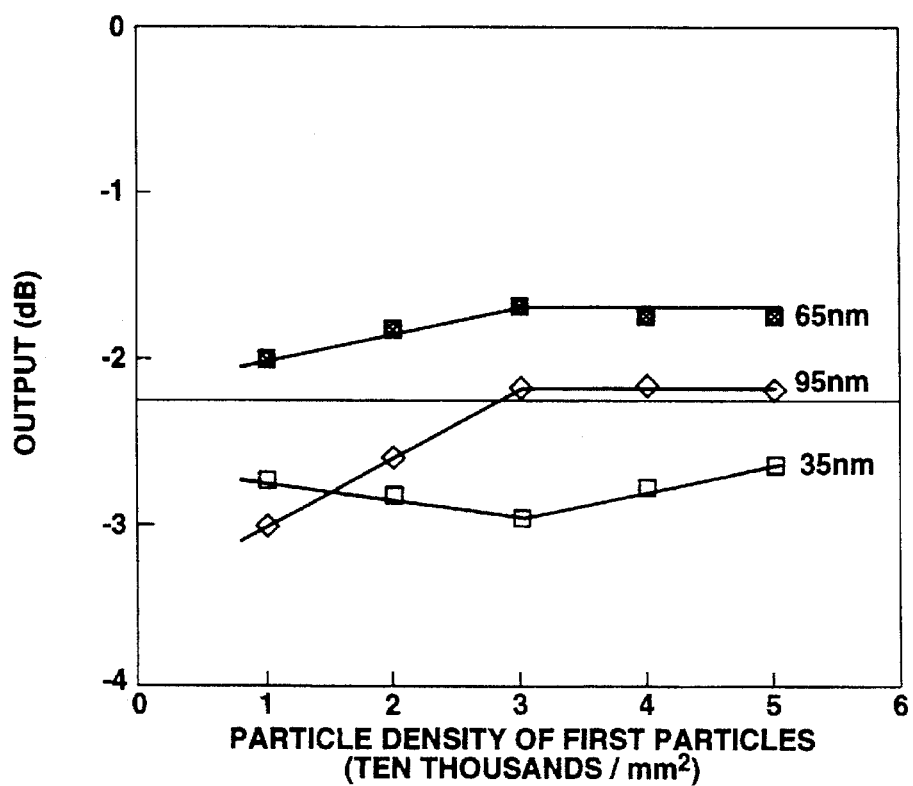
FIG. 12 is a graph showing the relation between the density of the first particle and the output level-down in the experiment 3.

These results were checked in conjunction with the relation between the particle density of the first particle 6 and the output level-down from the ideal state as reached after tape running for four hours as shown in FIG. 12.

It may thus be seen that, if the first particles 6 having the particle size of 35 nm±15 nm and the particle size of 95±15 nm are used, the output level-down becomes significant even within the above range of the particle size and, if the lower limit of the output level-down is set to −2.25 dB, the resulting tape becomes unusable. Conversely, if the first particles 6 having the particle size range of 65 nm±15 nm are used, a sufficient output level may be achieved within the above-mentioned particle density range. Meanwhile, the output level-down is not dependent upon the thickness of the carbon protective film 3.

It is seen from above that, if the second particles 7 having the particle size of 18 nm±5 nm are used, it is desirable to use the first particles 6 having the particle size of 65 nm±15 nm with the particle density of 1.0 to $4.0\times10^4$/mm$^2$.

With the magnetic tape, the first particle 6 for which is as defined above, the relation of the particle density of the second particle 7 versus still characteristics was checked. The still characteristics were defined as the average time in minutes until clogging occurred in eight magnetic heads, while the thickness of the carbon protective film 3 was set to 7 nm which is the value corresponding to the worst value of still characteristics within the range of the condition of the present experiment.

Figure 13:
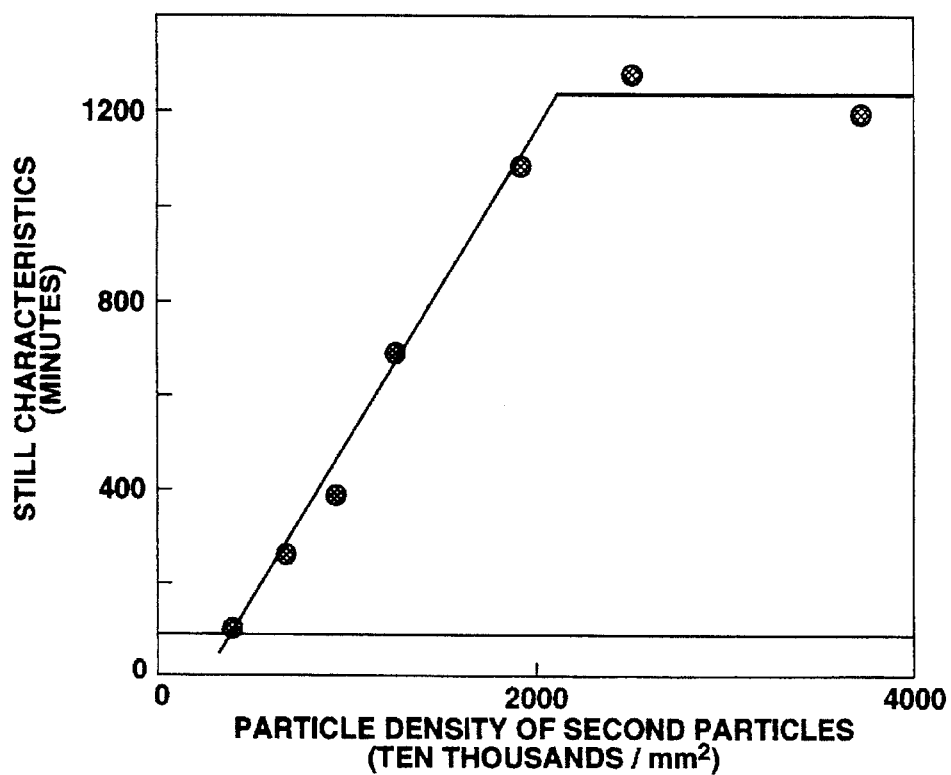
FIG. 13 is a graph showing the relation between the density of a second particle dispersed on the nonmagnetic substrate and still characteristics in the experiment 3.

The results are shown in FIG. 13, from which it is seen that, for obtaining practically acceptable still characteristics of not less than 100 minutes, it is necessary for the density of the second particle 7 to be not less than $400\times10^4$/mm$^2$.

Figure 14:
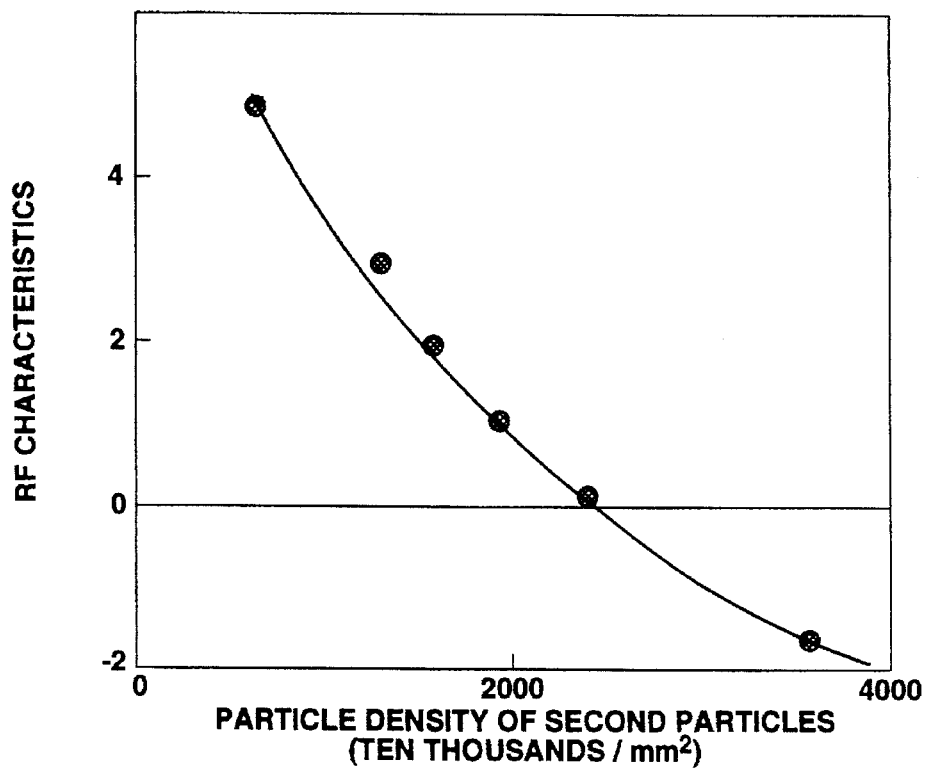
FIG. 14 is a graph showing the relation between the density of the second particle and RF characteristics in the experiment 3.

The relation between the particle density of the second particle 7 and RF characteristics is shown in FIG. 14. The thickness of the carbon protective film 3 was set to 15 nm which is the value corresponding to the worst output value within the range of the condition of the present experiment. Thus it may be seen that, in order to have the output of the RF characteristics not less than 0 dB, the density of the second particles 7 has to be set so as to be not higher than $2500\times10^4$/mm$^2$.

Consequently, if the high electro-magnetic conversion characteristics and high durability are desired to be achieved simultaneously, the density of the second particles has to be set to 400 to $2500\times10^4$/mm$^2$.

From the above results, it may be seen that, by fixing the first particles 6 having the particle size of 65 nm±15 nm and the second particles 7 having the particle size of 18 nm±5 nm at the densities of $1.0\times10^4$/mm$^2$ to $4.0\times10^4$/mm$^2$ and $400\times10^4$/mm$^2$ to $2500\times10^4$/mm$^2$, respectively, for producing protrusions on the non-magnetic substrate, and further forming the carbon protective film on the magnetic layer to a thickness of 7 nm to 15 nm, a magnetic tape having the electro-magnetic conversion characteristics in good equilibrium with the running characteristics may be produced.

Experiment 4

With magnetic tape samples in which the thickness of the carbon protective film 3 was set to 7 to 15 nm and the particle size of the second particle 7 was set to 28 nm±5 nm, the desirable particle size and the desirable particle density of the first particle were checked.

Figure 15:
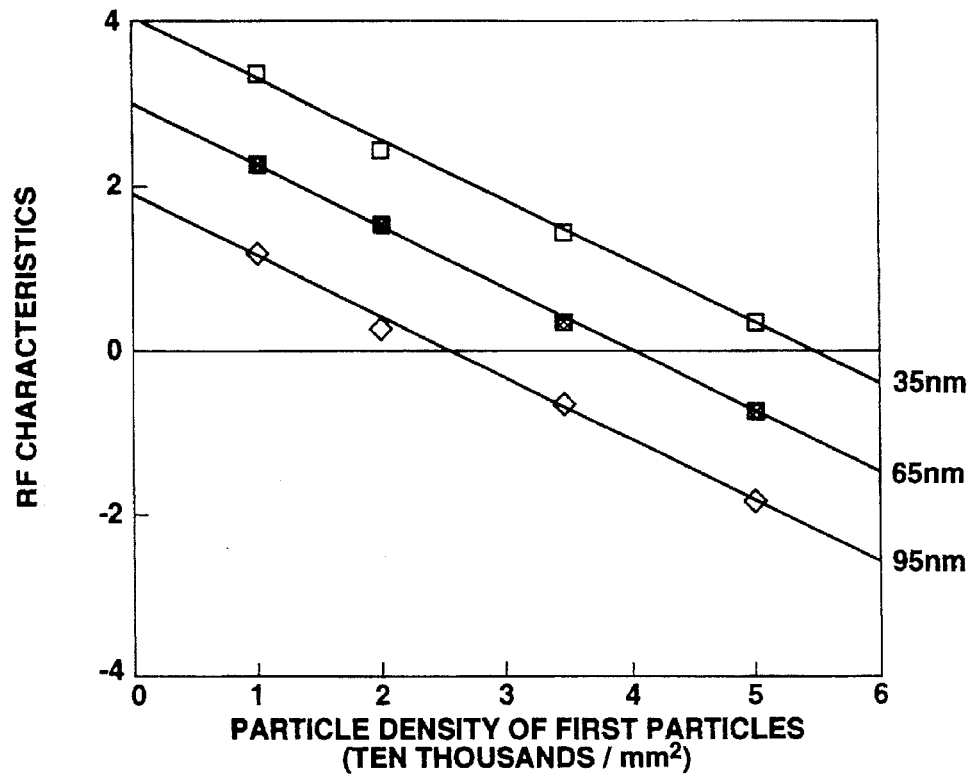
FIG. 15 is a graph showing the relation between the density of a first particle internally added in the non-magnetic substrate and RF characteristics, as affirmed by an experiment 4.

Thus the relation between the particle density and RF characteristics was checked for magnetic tape samples in which the first particles 6 having three particle size ranges of 35 nm±15 nm, 65 nm±15 nm and 95 nm±15 nm were changed in the particle density. The results are shown in FIG. 15. The thickness of the carbon protective film 3 was set to 15 nm which is the value corresponding to the worst output value within the range of the condition of the present experiment.

It is seen from FIG. 15 that, no matter which size particles are used as the first particles 6, the Rf characteristics are lowered with increase in the particle density of the first particles 6. Also the RF characteristics are lowered with increase in the particle size of the first particles 6 employed. It is also seen that, if an output not lower than 0 dB is desired to be produced, the particle density needs to be set to $5.0\times10^4$/mm$^2$ or less, $4.0\times10^4$/mm$^2$ or less and $2.8\times10^4$/mm$^2$ or less, for the particle size of the first particles 6 of 35 nm±15 nm, 65 nm±15 nm and 95 nm±15 nm, respectively.

Figure 16:
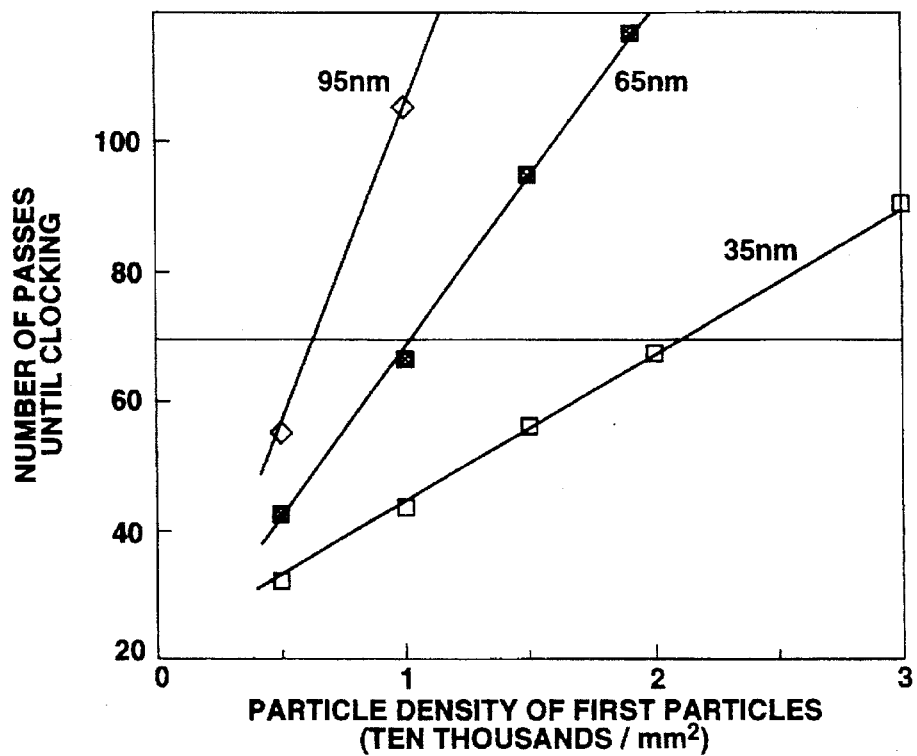
FIG. 16 is a graph showing the relation between the density of the first particle and the number of passes until clogging in the experiment 4.

On the other hand, the relation between the particle density of the first particles 6 and the number of passes up to clogging was checked for the magnetic tape samples having the above-described three different particle sizes. The results are shown in FIG. 16. The number of passes up to clogging is the number of passes until the first one of the five decks underwent clogging and the thickness of the carbon protective film 3 was set to 7 nm, which is the thickness most liable to clogging within the range of the condition of the present experiment.

It is seen from FIG. 16 that, no matter which particle size is used as the first particle 6, the higher is the particle density, the larger becomes the value of the number of passes up to clogging. If the number of passes is set to 70, it is necessary for the particle density to be not less than $2.0\times10^4$/mm$^2$ not less than $10\times10^4$/mm$^2$ and not less than $0.7\times10^4$/mm$^2$ for the particle size of the first particle 6 of 35±15 nm, 65±15 and 95±15 nm, respectively.

It has thus been found that, for achieving both the superior electro-magnetic conversion characteristics and durability, it is necessary for the particle density to be 2.0 to $5.0\times10^4$/mm$^2$, 1.0 to $4.0\times10^4$/mm$^2$ and 0.7 to $2.8\times10^4$/mm$^2$ for the particle size of the first particle 6 of 35 nm±15 nm, 65 nm±15 nm and 95 nm±15 nm, respectively.

Figure 17:
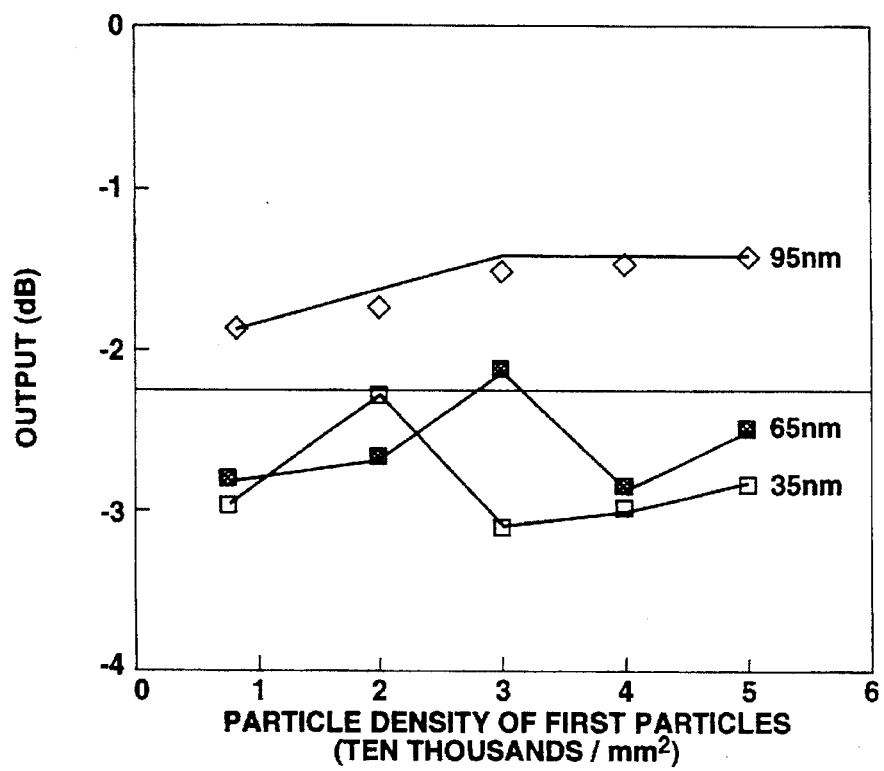
FIG. 17 is a graph showing the relation between the density of the first particle and the output level-down in the experiment 4.

If these results are analyzed in conjunction with the relation between the particle density of the first particles 6 shown in FIG. 17 and the output level-down from the ideal state as reached after running the tape for four hours, it may be seen that, for the particles 6 having the particle size of 35 nm±15 nm and the particles having the particle size of 65 nm±15 nm, the power level-down is significant even within the above range of the particle density, such that, if the lower limit of the power level-down is set to −2.25 dB, the magnetic tape becomes unusable. Conversely, if the particle having the particle size of 95 nm±15 nm is used, sufficient characteristics may be achieved within the above range of the particle density. It is noted that the power level-down value is not dependent on the thickness of the carbon protective film 3.

It has been seen from above that, if the second particle 7 having the particle size of 28 nm±5 nm is used, it is preferred to use the first particle 6 having the particle size of 95 nm+15 nm with the particle density of 0.7 to $2.8 \times 10^4$/mm$^2$.

With the magnetic tape, the first particle 6 for which is as defined above, the relation of the particle density of the second particle 7 versus still characteristics was checked. The still characteristics were defined as the average time in minutes until clogging occurred in eight magnetic heads, while the thickness of the carbon protective film 3 was set to 7 nm which is the value corresponding to the worst value of still characteristics within the range of the condition of the present experiment.

Figure 18:
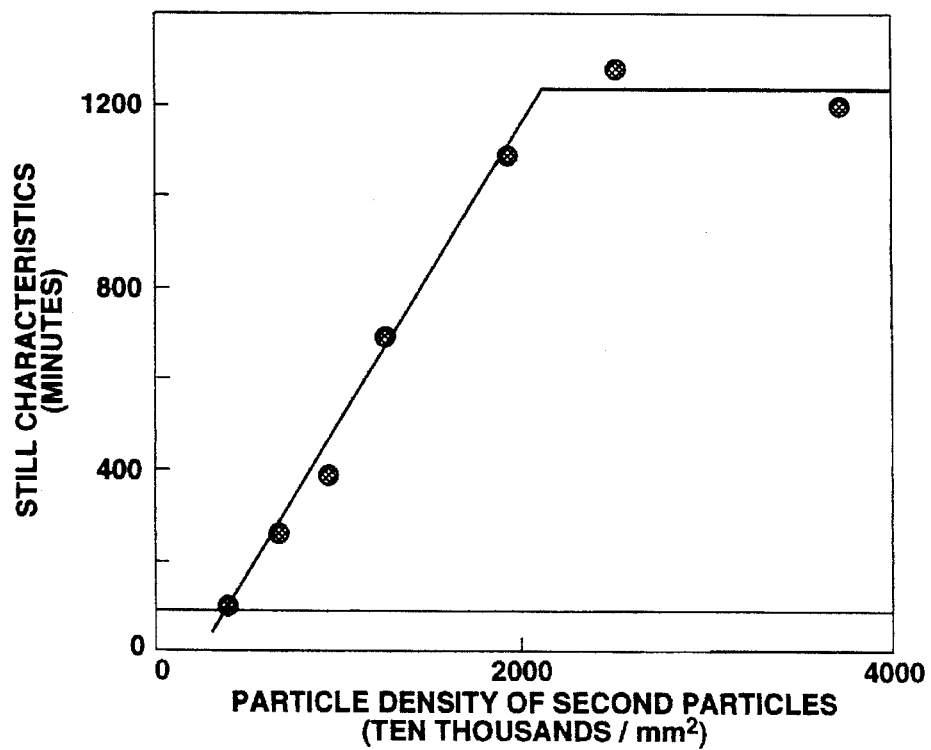
FIG. 18 is a graph showing the relation between the density of a second particle dispersed on the nonmagnetic substrate and still characteristics in the experiment 4.

The results are shown in FIG. 18, from which it is seen that, for obtaining practically acceptable still characteristics of not less than 100 minutes, it is necessary for the density of the second particle 7 to be not less than $400 \times 10^4$/mm$^2$.

Figure 19:
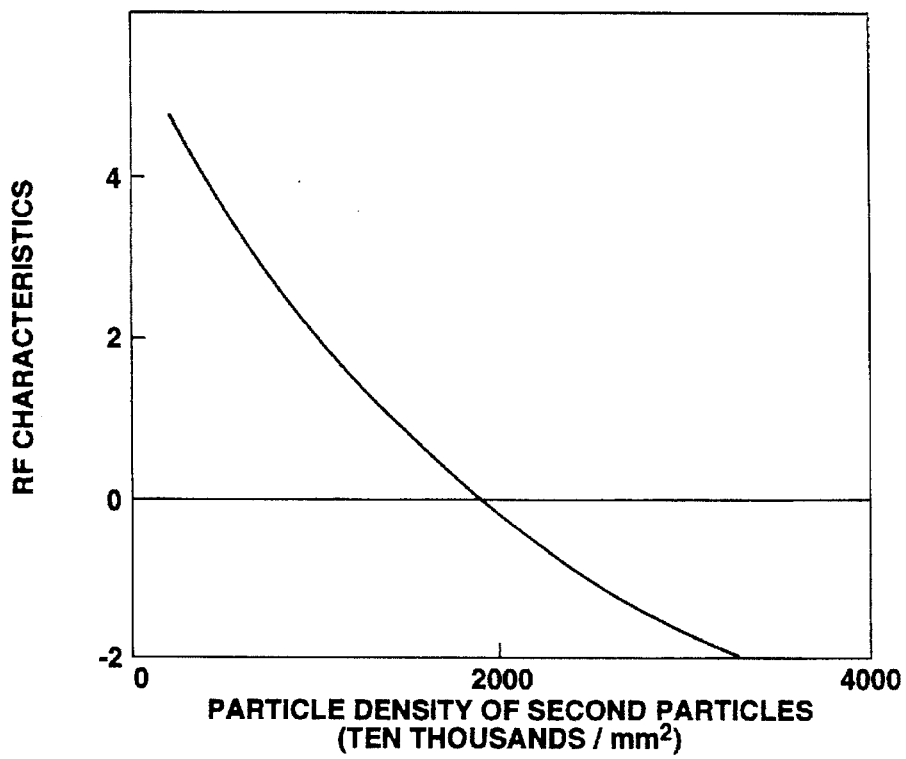
FIG. 19 is a graph showing the relation between the density of the second particle and RF characteristics in the experiment 4.

FIG. 19 shows the relation between the particle density of the second particles 7 and RF characteristics. The thickness of the carbon protective film 3 was set to 15 nm which is the value corresponding to the worst output value within the range of the condition of the present experiment. Thus it may be seen that, in order to have the output of the RF characteristics of not less than 0 dB, the density of the second particles 7 has to be set to not higher than $2000 \times 10^4$/mm$^2$.

Consequently, if the superior electro-magnetic conversion characteristics and the superior durability should be achieved simultaneously, it is necessary to set the density of the second particle 7 so as to be 400 to $2000 \times 10^4$/mm$^2$.

From the above results, it may be seen that, by fixing the first particles 6 having the particle size of 95 nm±15 nm and the second particles 7 having the particle size of 28 nm±5 nm at the densities of $0.7 \times 10^4$/mm$^2$ to $2.8 \times 10^4$/mm$^2$ and $400 \times 10^4$/mm$^2$ to $2000 \times 10^4$/mm$^2$, respectively, for producing protrusions on the non-magnetic substrate, and further forming the carbon protective film on the magnetic layer to a thickness of 7 nm to 15 nm, a magnetic tape having the electro-magnetic conversion characteristics in good equilibrium with the running characteristics may be produced.

Experiment 5

With magnetic tape samples in which the thickness of the carbon protective film 3 was set to 15 nm to 30 nm and the particle size of the second particle 7 was set to 18 nm±5 nm, the desirable particle size and the desirable particle density of the first particle were checked.

Figure 20:
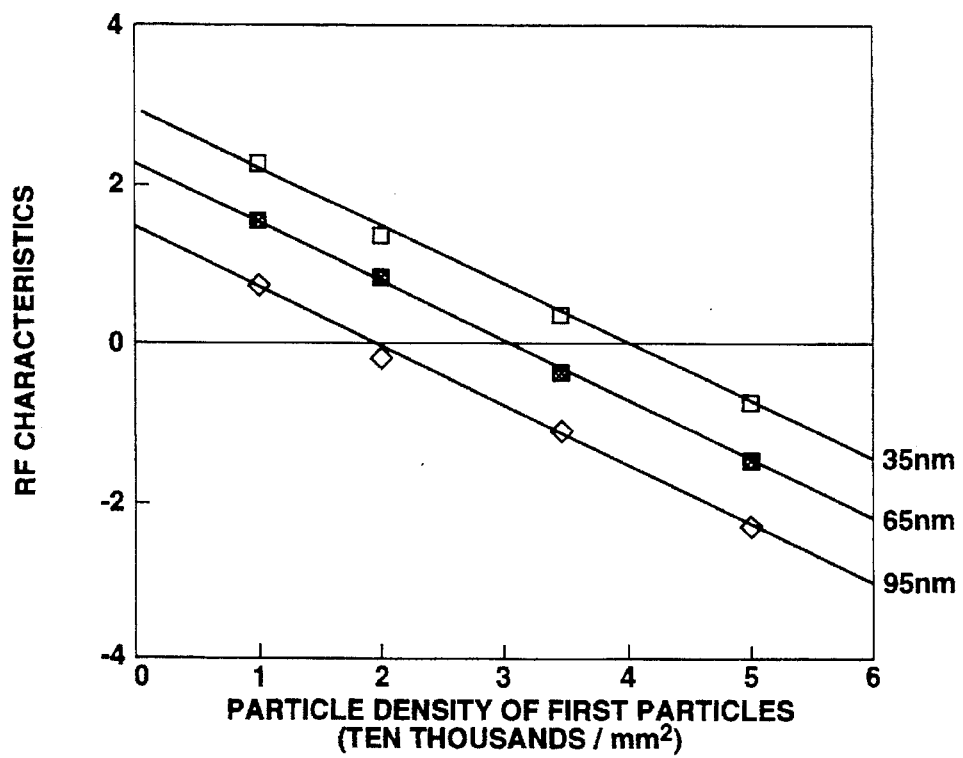
FIG. 20 is a graph showing the relation between the density of a first particle internally added in the non-magnetic substrate and RF characteristics, as affirmed by an experiment 5.

Thus the relation between the particle density and RF characteristics was checked for magnetic tape samples in which the first particles 6 having three particle size ranges of 35 nm±15 nm, 65 nm±15 nm and 95 nm±15 nm were changed in the particle density. The results are shown in FIG. 20. The thickness of the carbon protective film 3 was set to 30 nm which is the value corresponding to the worst output value within the range of the condition of the present experiment.

It is seen from FIG. 20 that, no matter which size of the particles is used for the first particle 6, the higher the particle density of the first particle 6, the lower become the RF characteristics, and the larger the particle size of the first particle 6, the lower become the RF characteristics.

It is also seen that, if an output not lower than 0 dB is desired, the particle density needs to be set to $4.0 \times 10^4$/mm$^2$ or less, $3.0 \times 10^4$/mm$^2$ or less and $2.0 \times 10^4$/mm$^2$ or less, for the particle size of the first particles 6 of 35 nm±15 nm, 65 nm±15 nm and 95 nm±15 nm, respectively.

Figure 21:
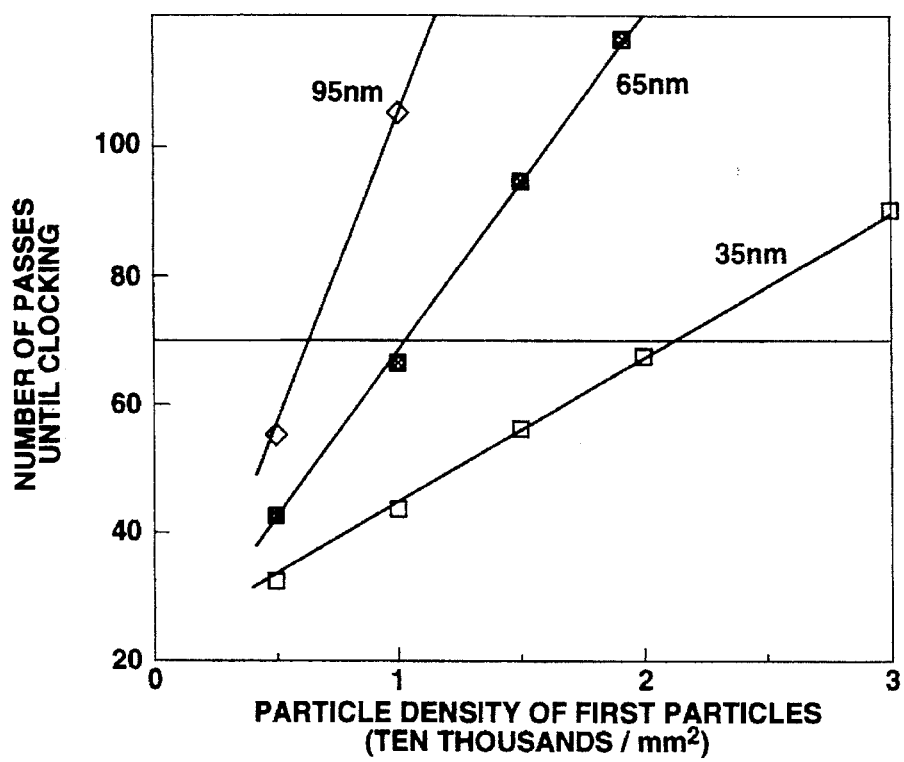
FIG. 21 is a graph showing the relation between the density of the first particle and the number of passes until clogging in the experiment 5.

On the other hand, the relation between the particle density of the first particles 6 and the number of passes up to clogging was checked for the magnetic tape samples with the above-described three different particle sizes of the first particles 6. The results are shown in FIG. 21. The number of passes up to clogging is the number of passes until the first one of the five decks underwent the clogging, and the thickness of the carbon protective film 3 was set to 15 nm, which is the thickness most liable to clogging within the range of the condition of the present experiment.

It is seen from FIG. 21 that, no matter which particle size is used as the first particle 6, the higher is the particle density, the larger becomes the value of the number of passes up to clogging. If the number of passes is set to 70, it is necessary for the particle density to be not less than $2.0 \times 10^4$/mm$^2$, not less than $1.0 \times 10^4$/mm$^2$ and not less than $0.7 \times 10^4$/mm$^2$, for the particle size of the first particle 6 of 35 nm±15 nm, 65 nm±15 nm and 95 nm±15 nm, respectively.

Figure 22:
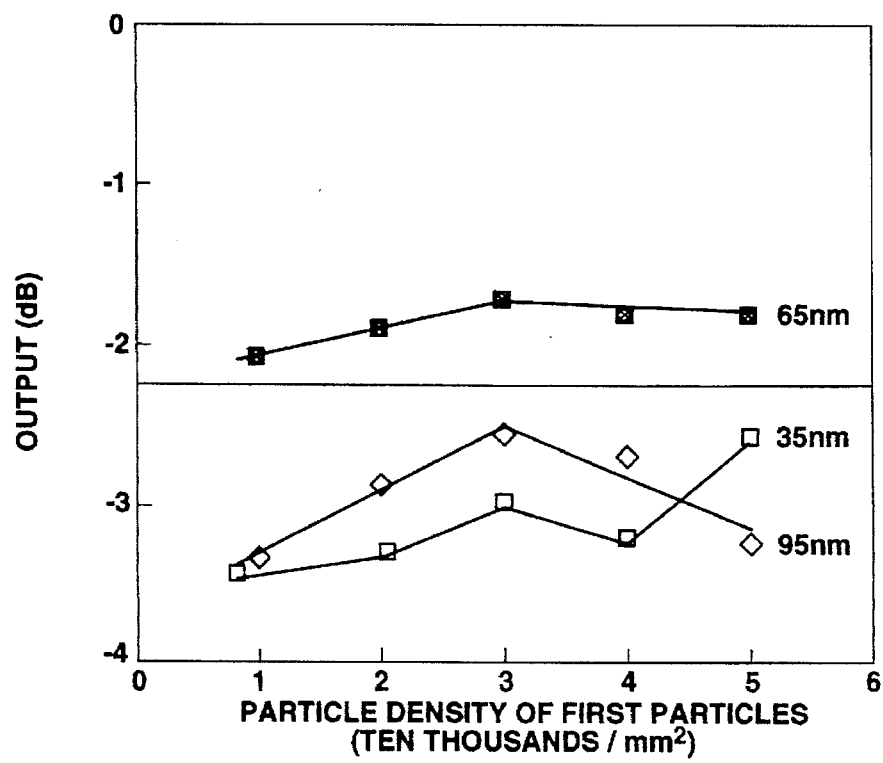
FIG. 22 is a graph showing the relation between the density of the first particle and the output level-down in the experiment 5.

These results were checked in conjunction with the relation between the particle density of the first particle 6 and the output level-down from the ideal state as reached after tape running for four hours as shown in FIG. 22.

It may thus be seen that, if the first particles 6 having the particle size of 35 nm±15 nm and the particle size of 95 nm±15 nm are used, the output level-down becomes significant even within the above range of the particle size, and that, if the lower limit of the output level-down is set to −2.25 dB, the resulting tape becomes unusable. Conversely, if the first particles 6 having the particle size range of 65 nm±15 nm are used, a sufficient output level may be achieved within the above-mentioned particle density range. Meanwhile, the output level-down is not dependent upon the thickness of the carbon protective film 3.

It is seen from above that, if the second particles 7 having the particle size of 18 nm±5 nm are used, it is desirable to use the first particles 6 having the particle size of 65 nm±15 nm with the particle density of 1.0 to $3.0 \times 10^4$mm$^2$.

With the magnetic tape, the first particle 6 for which is as defined above, the relation of the particle density of the second particle 7 versus still characteristics was checked. The still characteristics were defined as the average time in minutes until clogging occurred in eight magnetic heads, while the thickness of the carbon protective film 3 was set to 15 nm which is the value corresponding to the worst value of still characteristics within the range of the condition of the present experiment.

Figure 23:
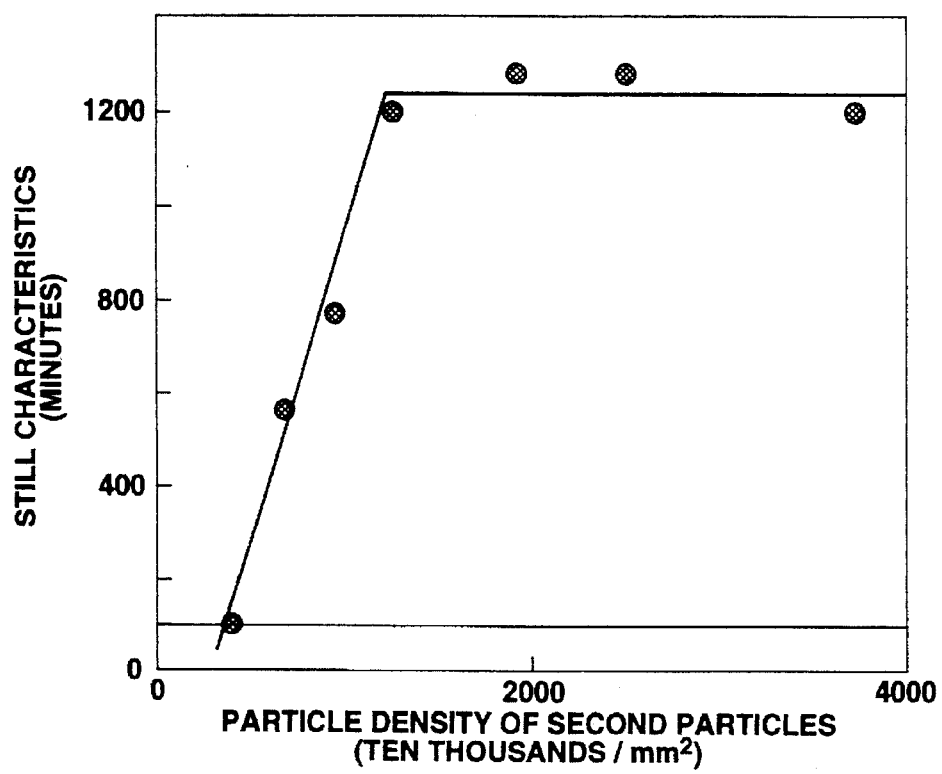
FIG. 23 is a graph showing the relation between the density of a second particle dispersed on the non-magnetic substrate and still characteristics in the experiment 5.

The results are shown in FIG. 23, from which it is seen that, for obtaining practically acceptable still characteristics of not less than 100 minutes, it is necessary for the density of the second particle 7 to be not less than $400 \times 10^4$/mm$^2$.

Figure 24:
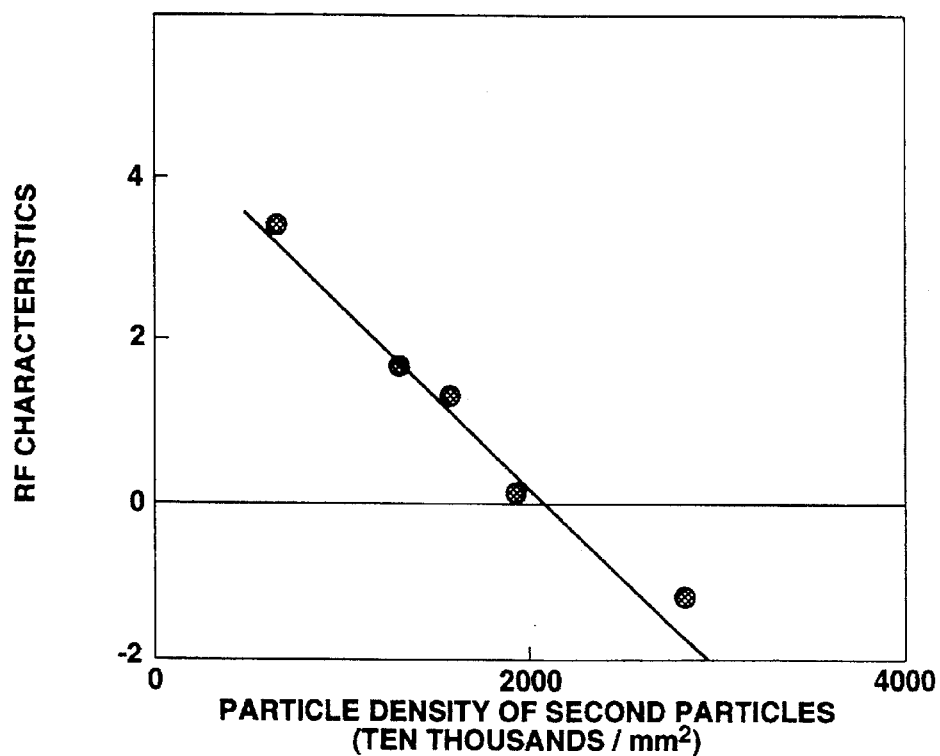
FIG. 24 is a graph showing the relation between the density of the second particle and RF characteristics in the experiment 5.

FIG. 24 shows the relation between the particle density of the second particles 7 and RF characteristics. The thickness of the carbon protective film 3 was set to 30 nm, which is the value corresponding to the worst output value within the range of the condition of the present experiment.

Thus it may be seen that, in order to have an output of RF characteristics of not less than 0 dB, the density of the second particles 7 has to be set to not less than $2000 \times 10^4/mm^2$.

Thus it has been seen that, if satisfactory electro-magnetic conversion characteristics and excellent durability should be achieved simultaneously, the density of the second particles 7 has to be set so as to be 400 to $2000 \times 10^4/mm^2$ or less.

From the above results, it may be seen that, by fixing the first particles 6 having the particle size of 65 nm±15 nm and the second particles 7 having the particle size of 18 nm±5 nm at, the densities of $1.0 \times 10^4/mm^2$ to $3.0 \times 10^4/mm^2$ and $400 \times 10^4/mm^2$ to $2000 \times 10^4/mm^2$, respectively, for producing protrusions on the non-magnetic substrate, and further forming the carbon protective from on the magnetic layer to a thickness of 15 nm to 30 nm, a magnetic tape having the electro-magnetic conversion characteristics in good equilibrium witch the running characteristics may be produced.

It is seen from the above experiments 1 to 5 that, if any one of the following six conditions are met, the magnetic tape having the electro-magnetic conversion characteristics in good equilibrium with the running characteristics may be produced.

The first condition is that the carbon protective film has a thickness of 3 to 7 nm, first surface protrusions having the height of 65 nm±15 nm are formed on the surface of the carbon protective film at a density of $1.5 \times 10^4$ to $6.0 \times 10^4/mm^2$ and second surface protrusions having the height of 18 nm±5 nm are formed on the surface of the carbon protective from at a density of $500 \times 10^4$ to $4500 \times 10^4/mm^2$.

The second condition is that the carbon protective film has a thickness of 3 to 7 nm, first surface protrusions having the height of 65 nm±15 nm are formed on the surface of the carbon protective film at a density of $1.1 \times 10^4$ to $5.0 \times 10^4/mm^2$ and second surface protrusions having the height of 28 nm±5 nm are formed on the surface of the carbon protective film at a density of $400 \times 10^4$ to $4000 \times 10^4/mm^2$.

The third condition is that the carbon protective film has a thickness of 3 to 7 nm, first surface protrusions having the height of 95 nm±15 nm are formed on the surface of the carbon protective film at a density of $1.0 \times 10^4$ to $4.0 \times 10^4/mm^2$ and second surface protrusions having the height of 28 nm±5 nm are formed on the surface of the carbon protective film at a density of $400 \times 10^4$ to $35.00 \times 10^4/mm^2$.

The fourth condition is that the carbon protective film has a thickness of 7 to 15 nm, first surface protrusions having the height of 65 nm±15 nm are formed on the surface of the carbon protective film at a density of $1.0 \times 10^4$ to $4.0 \times 10^4/mm^2$ and second surface protrusions having the height of 18 nm±5 nm are formed on the surface of the carbon protective film at a density of $400 \times 10^4$ to $2500 \times 10^4/mm^2$.

The fifth condition is that the carbon protective film has a thickness of 7 to 15 nm, first surface protrusions having the height of 95 nm±15 nm are formed on the surface of the carbon protective film at a density of $0.7 \times 10^4$ to $2.8 \times 10^4/mm^2$ and second surface protrusions having the height of 28 nm±5 nm are formed on the surface of the carbon protective film at a density of $400 \times 10^4$ to $2000 \times 10^4/mm^2$.

The sixth condition is that the carbon protective film has a thickness of 15 to 30 nm, first surface protrusions having the height of 65 nm±15 nm are formed on the surface of the carbon protective film at a density of $1.0 \times 10^4$ to $3.0 \times 10^4/mm^2$ and second surface protrusions having the height of 18 nm±5 nm are formed on the surface of the carbon protective film at a density of $400 \times 10^4$ to $2000 \times 10^4/mm^2$.

From the above it may be seen that the present invention provides a magnetic recording medium having a thin magnetic metal layer and a carbon protective layer formed on the non-magnetic substrate, in which two different kinds of protrusion having different depths are formed on the carbon protective film to a pre-set density for controlling the surface properties of the recording medium, it becomes possible to prevent the electro-magnetic conversion characteristics of the recording medium from being lowered due to the spacing loss, thereby improving its running durability.

What is claimed is:

1. A magnetic recording medium comprising:

a non-magnetic substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm.

2. A magnetic recording medium comprising:

non-magnetic substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in a range of 3 nm to 7 nm, the first protrusions having a height in the range of 65 nm±15 nm are formed on the surface of the carbon protective film at a density of $1.5 \times 10^4/mm^2$ to $6.0 \times 10^4/mm^2$ and the second protrusions having a height in the range of 18 nm±5 nm are formed on the surface of the carbon protective film at a density of $500 \times 10^4$ to $4500 \times 10^4/mm^2$.

3. A magnetic recording medium comprising:

a non-magnetic substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in a range of 3 nm to 7 nm, the first protrusions having a height in the range of 65 nm±15 nm are formed on the surface of the carbon protective film at a density of $1.1 \times 10^4/mm^2$ to $5.0 \times 10^4/mm^2$ and the second protrusions having a height in the range of 28 nm±5 nm are formed on the surface of the carbon protective film at a density of $400 \times 10^4$ to $4000 \times 10^4/mm^2$.

4. A magnetic recording medium comprising:

a non-magnetic Substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in a range of 3 nm to 7 nm, the first protrusions having a height in the range of 95 nm±15 nm are formed on the surface of the carbon protective film at a density of $1.0 \times 10^4/mm^2$ to $4.0 \times 10^4/mm^2$ and the second protrusions having a height in the range of 28 nm±5 nm are formed on the surface of the carbon protective film at a density of $400 \times 10^4$ mm$^2$ to $3500 \times 10^4/mm^2$.

5. A magnetic recording medium comprising:

a non-magnetic substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in the range of 7 nm to 15 nm, the first protrusions having a height in the range of 65 nm±15 nm are formed on the surface of the carbon protective film at a density of $1.0 \times 10^4/mm^2$ to $4.0 \times 10^4/mm^2$ and the second protrusions having a height in the range of 18 nm±5 nm are formed on the surface of the carbon protective film at a density of $400 \times 10^4$ to $2500 \times 10^4/mm^2$.

6. A magnetic recording medium comprising:

a non-magnetic substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in the range of 7 nm to 15 nm, the first protrusions having a height in the range of 95 nm±15 nm are formed on the surface of the carbon protective film at a density of $0.7 \times 10^4/mm^2$ to $2.8 \times 10^4/mm^2$ and the second protrusions having a height in the range of 28 nm±5 nm are formed on the surface of the carbon protective film at a density of $400 \times 10^4$ to $2000 \times 10^4/mm^2$.

7. A magnetic recording medium comprising:

a non-magnetic Substrate, a magnetic metal layer formed on said non-magnetic substrate, and a carbon protective film formed on said magnetic metal layer, the carbon protective film having a thickness in a range of 3 nm to 30 nm, said carbon protective film presenting first and second protrusions, said first protrusions having a height in a range of 65 nm±15 nm to 95 nm±15 nm, said second protrusions having a height in a range of from 18 nm±5 nm to 28±5 nm and substantially no protrusions having a height in a range from 33 nm to 50 nm wherein the carbon protective film has a thickness in the range of 15 nm to 30 nm, the first protrusions having a height in the range of 65 nm±15 nm are formed on the surface of the carbon protective film at a density of $1.0 \times 10^4/mm^2$ to $3.0 \times 10^4/mm^2$ and the second protrusions having a height in the range of 18 nm±5 nm are formed on the surface of the carbon protective film at a density of $400 \times 10^4$ to $2000 \times 10^4/mm^2$.

* * * * *